(12) United States Patent
Wilcher et al.

(10) Patent No.: US 7,824,549 B2
(45) Date of Patent: Nov. 2, 2010

(54) HIGH EFFICIENCY GRIT REMOVAL SYSTEM

(75) Inventors: Stephen B. Wilcher, Harleysville, PA (US); Robert Slaby, Center Valley, PA (US); Thomas W. Quimby, Hatboro, PA (US)

(73) Assignee: WSG & Solutions, Inc., Montgomeryville, PA (US)

(*) Notice: Subject to any disclaimer, the term of this patent is extended or adjusted under 35 U.S.C. 154(b) by 81 days.

(21) Appl. No.: 12/248,979

(22) Filed: Oct. 10, 2008

(65) Prior Publication Data

US 2009/0095672 A1    Apr. 16, 2009

Related U.S. Application Data

(60) Provisional application No. 60/998,324, filed on Oct. 10, 2007.

(51) Int. Cl.
*B01D 21/24* (2006.01)
(52) U.S. Cl. .............. 210/220; 210/519; 210/521; 210/523; 210/540
(58) Field of Classification Search .......... 210/220, 210/519, 521, 523, 532.1, 540
See application file for complete search history.

(56) References Cited

U.S. PATENT DOCUMENTS

| | | | | | |
|---|---|---|---|---|---|
| 2,118,157 | A | * | 5/1938 | Camp | 210/519 |
| 3,161,590 | A | * | 12/1964 | Weis et al. | 210/519 |
| 3,221,889 | A | * | 12/1965 | Hirsch | 210/532.1 |
| 3,710,941 | A | * | 1/1973 | Brociner | 210/220 |
| 4,064,054 | A | * | 12/1977 | Anderson et al. | 210/521 |
| 4,886,605 | A | * | 12/1989 | Herve | 210/519 |
| 4,985,148 | A | * | 1/1991 | Monteith | 210/519 |
| 5,605,636 | A | * | 2/1997 | Wyness | 210/521 |
| 6,997,328 | B2 | | 2/2006 | Wilcher et al. | |

* cited by examiner

*Primary Examiner*—Christopher Upton
(74) *Attorney, Agent, or Firm*—Michael Best & Friedrich LLP

(57) ABSTRACT

An assembly for removing grit particles from a fluid having a flow. The assembly includes a tank having walls for holding fluid for separation of grit particles from the fluid, a fluid inlet for flow of fluid into the tank, a fluid outlet for flow of fluid from the tank, an inlet diffusion baffle assembly including a baffle positioned to direct fluid flow toward the tank walls and a lower chamber of the tank, and an outlet baffle assembly including a baffle positioned in a rear of the tank at an upward slope from the center of the tank toward the fluid outlet configured to direct fluid flow toward the center of the tank.

17 Claims, 27 Drawing Sheets

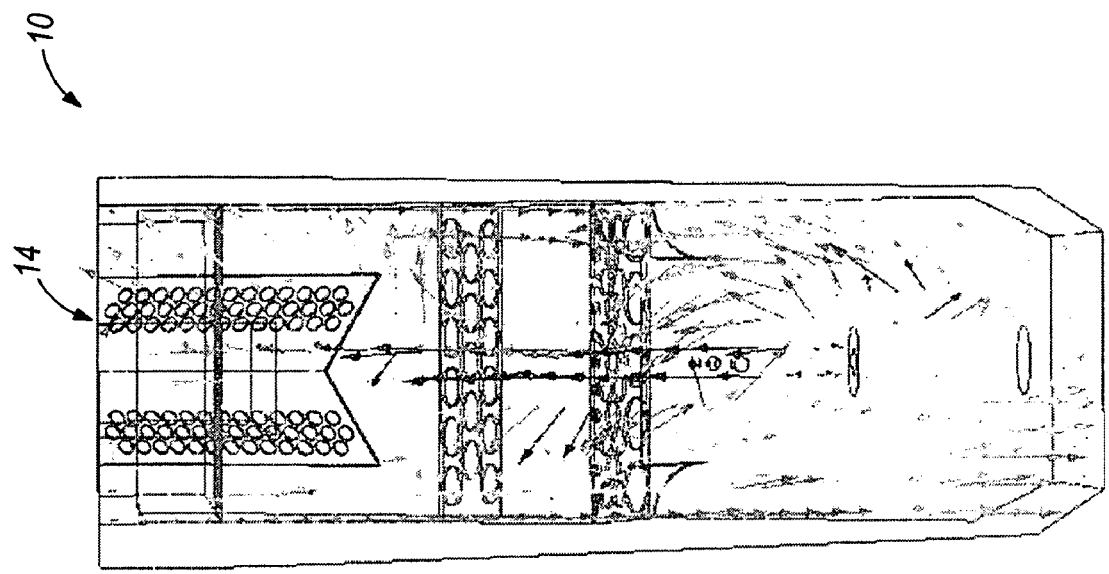
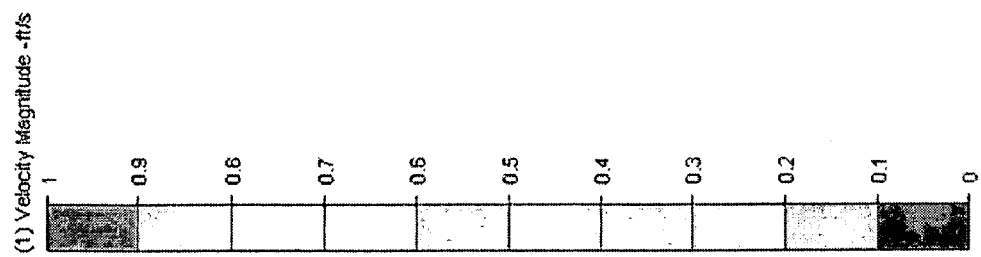
FIG. 14

HIGH EFFICIENCY GRIT REMOVAL SYSTEM

CROSS-REFERENCE TO RELATED APPLICATION

The present patent application claims priority to U.S. Provisional Patent Application Ser. No. 60/998,324, entitled "HIGH EFFICIENCY GRIT REMOVAL SYSTEM," filed Oct. 10, 2007 by Stephen B. Wilcher, Robert Slaby, and Thomas W. Quimby, the entire content of which is hereby incorporated by reference.

BACKGROUND

The present invention relates to wastewater treatment, and in particular to a high efficiency grit removal system.

Wastewater treatment facilities generally utilize grit handling and removal equipment to isolate and remove coarse solids contained in a waste flow stream prior to the flow stream continuing toward other downstream processes. Utilizing grit removal processes or techniques also aids in reducing maintenance costs and grit related operational difficulties, such as including, but not limited to protecting sludge pumps, piping, centrifuges, and the like from the scouring and wearing action of grit. Grit removal processes also prevent grit from reducing a plant's overall efficiency as a result of clogged sumps and pipes and build-ups in fluid channels, settling basins, flocculation tanks and digestion tanks.

Grit contained in the process flow stream can be removed by mechanical devices, including but not limited to bucket elevators, traveling bridge mechanisms, chains and scrapers, vortex grit tanks, aerated chambers, eductor tube designs and grit pumps. Some products are more effective than others at dealing with the wide range of variables found in the process, such as varying flow stream velocity and quantity.

Wastewater plants may also require that smaller grit sizes, such as 100 mesh or 150 mesh, be removed from the influent waste flow stream, especially with combined systems becoming more prevalent. Wastewater treatment facilities have also cut back on maintenance staffs, therefore the need to reduce maintenance efforts is increasing. Combined systems deliver significantly higher flow at more common intervals and for longer periods of time. Very small grit particles contained in the waste flow streams, such as 100-mesh or 150-mesh, are much more difficult to remove since such particles tend to stay suspended and do not settle out very well unless very large tank liquid volumes are utilized to allow enough detention time within the tank for separation to occur.

In some wastewater treatment facilities, Vortex grit separation systems are utilized as first stage methods. The Vortex grit separation systems can handle larger flows and are run generally on a continuous basis during storm events and routine daily flows. However, these systems are not very efficient and have difficulty removing a high percentage of finer grit particles.

Smaller wastewater treatment facilities, such as those in small towns and municipalities, deal with much smaller water flow streams but also have limited funding. Such facilities need the lowest cost process, yet still have an effective process for reducing abrasive wear to the downstream processes and equipment. One of the efficiency problems with the Vortex grit removal process, which is also found in many smaller facilities, is that it is affected by variations or changes in flow stream conditions. For example, under storm flow conditions, design of the Vortex system tends to loose efficiency rapidly because the design does not adequately handle extreme flow rate variations. Vortex units typically contain a gear driven propeller mechanism to assist in keeping the flow in a desired pattern and to control velocity. However this adds mechanical equipment into a harsh environment, and most equipment located in this type of waste stream will require maintenance. When maintenance must be performed, tanks must be dewatered to allow access to wear-prone equipment located below the water surface. Furthermore, the Vortex process has a relatively low efficiency and has only been marginally effective (approx. 65-85% efficient) at separation and removal of 100 and 65 mesh particles, respectively.

Chain and bucket designs in aerated grit basins can handle 65-mesh requirements, but with all the mechanical components involved, such as including but not limited to buckets, chains, and bearings that are all subject to wear, many cities have gone away from this technology in favor of vortex removal because the vortex removal utilizes less wearable parts. Chain and scraper drag out units have also been utilized as removal devices. Chain and scraper drag out units can handle 65 mesh requirements but generally cannot effectively handle 100 or 150 mesh removal requirements.

Screw conveyors are also used for grit removal. Screw conveyors can act either as a feeder for bucket designs or as the actual removal unit set on an incline to lift and dewater the settled solids. However, inclined screws are inefficient at removal unless run at very slow speeds when handling finer mesh particles such as 100-mesh or 150-mesh, thereby reducing overall capacity. Generally, screw conveyors can remove grit particles heavy enough to settle. However, lighter fine materials tend to remain suspended in the lower bottom end of the tank and when combined with water can change the specific gravity of the pool volume. This suspended fine material then gets easily agitated by the screw conveyor and tends to flow over the effluent weirs, thereby short-circuiting the systems and reducing removal efficiencies.

From a facility design standpoint, it can be difficult to classify grit sizes. Also, the actual quantities of settled grit in the various designs can vary dramatically. Ranges of grit size and quantity can be also compounded by the age of a facility, the condition of the facility and whether the systems are gravity fed or pumped flow. Many plants also have issues with storm flows, runoff water, and dirt infiltration. Typical grit quantities or grit loads can range from 0.8 ft$^3$ to over 500 ft$^3$ per million gallons of flow. A commonly utilized design estimate or guideline is 4-5 ft$^3$ per MGD (millions of gallon per day) for closed sanitary systems and 8-10 ft$^3$ per MGD for combined systems. Additionally, it is important to establish a minimum pool depth along with enough tank volume of the unit in order to allow enough area and detention time for the flow to quies and achieve effective grit settling prior to discharge.

Standard equipment specifications generally require that products guarantee approximately 95% removal of 65-mesh grit or larger with a specific gravity of 2.65. Through numerous studies along with lab and field testing, it has been determined that the pool develops a lower specific gravity as a result of the smaller and lighter grit particles being continually re-suspended by agitation; therefore, an improved method or means to force rapid settling of the finer materials without a prolonged detention time is required and needed in the industry.

Grit particles will typically not settle out when velocities (whether in tanks or fluid channels) are above 0.75 to 1.0 feet per second for 65 mesh or greater size particles. Through lab testing, field testing and site testing, it has been determined that when attempting to remove 100-mesh grit particles, internal tank volume and velocities of approximately 0.25 to 0.5 feet per second should be achieved. Additionally, to remove 150-mesh grit particles, velocities of approximately 0.10 to 0.25 feet per second should be achieved. Table 1 below shows grit particle size data.

TABLE 1

Mesh to Micron Conversion Chart.

| US MESH | INCHES | MICRONS | MILLIMETERS |
|---|---|---|---|
| 60 | 0.0098 | 250 | 0.250 |
| 65 | 0.0093* | 235* | 0.235* |
| 100 | 0.0059 | 149 | 0.149 |
| 140 | 0.0041 | 105 | 0.105 |
| 150 | 0.0038* | 96* | 0.096* |
| 170 | 0.0035 | 88 | 0.088 |

Source: TM Industrial Supply, http://www.fluideng.com/FE/meshmicron.html
*extrapolated values Larger pool areas and lower surface loading rates compensate and allow for increased retention time to promote settling, but dramatically increase capital costs and construction costs. Furthermore, utilization of forced air creates rolling flow patterns within the tanks, thereby also promoting grit settling, but also increasing cost.

The object of a new invention is therefore driven by various needs such that the new design should not rely on large surface areas, large tank volumes, long tanks, and pool depths to allow for effective settling. The design should have the overall ability to separate grit from a waste flow stream quickly and efficiently within a small economical construction footprint. The design should reduce or eliminate moving or rotating mechanical equipment subject to abrasive wear and replacement, including but not limited to screw conveyors, bucket elevators, chain and flight collector or scraper mechanisms, which can typically include chains, sprockets, bearings, flights, wear shoes, and the like. The design should also reduce or eliminate routine maintenance requirements associated with submerged mechanical equipment. The design should simplify basin construction requirements and eliminate complicated construction or circular geometry as required by other designs and processes available on the market today.

SUMMARY

In one embodiment, the invention provides an assembly for removing grit particles from a fluid having a flow. The assembly includes a tank having walls for holding fluid for separation of grit particles from the fluid, a fluid inlet for flow of fluid into the tank, a fluid outlet for flow of fluid from the tank, an inlet diffusion baffle assembly including a baffle positioned to direct fluid flow toward the tank walls and a lower chamber of the tank, and an outlet baffle assembly including a baffle positioned in a rear of the tank at an upward slope from the center of the tank toward the fluid outlet configured to direct fluid flow toward the center of the tank.

Other aspects of the invention will become apparent by consideration of the detailed description and accompanying drawings.

BRIEF DESCRIPTION OF THE DRAWINGS

FIG. 14 is a velocity vector plot of FIG. 13.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting.

DETAILED DESCRIPTION

Figure 1:
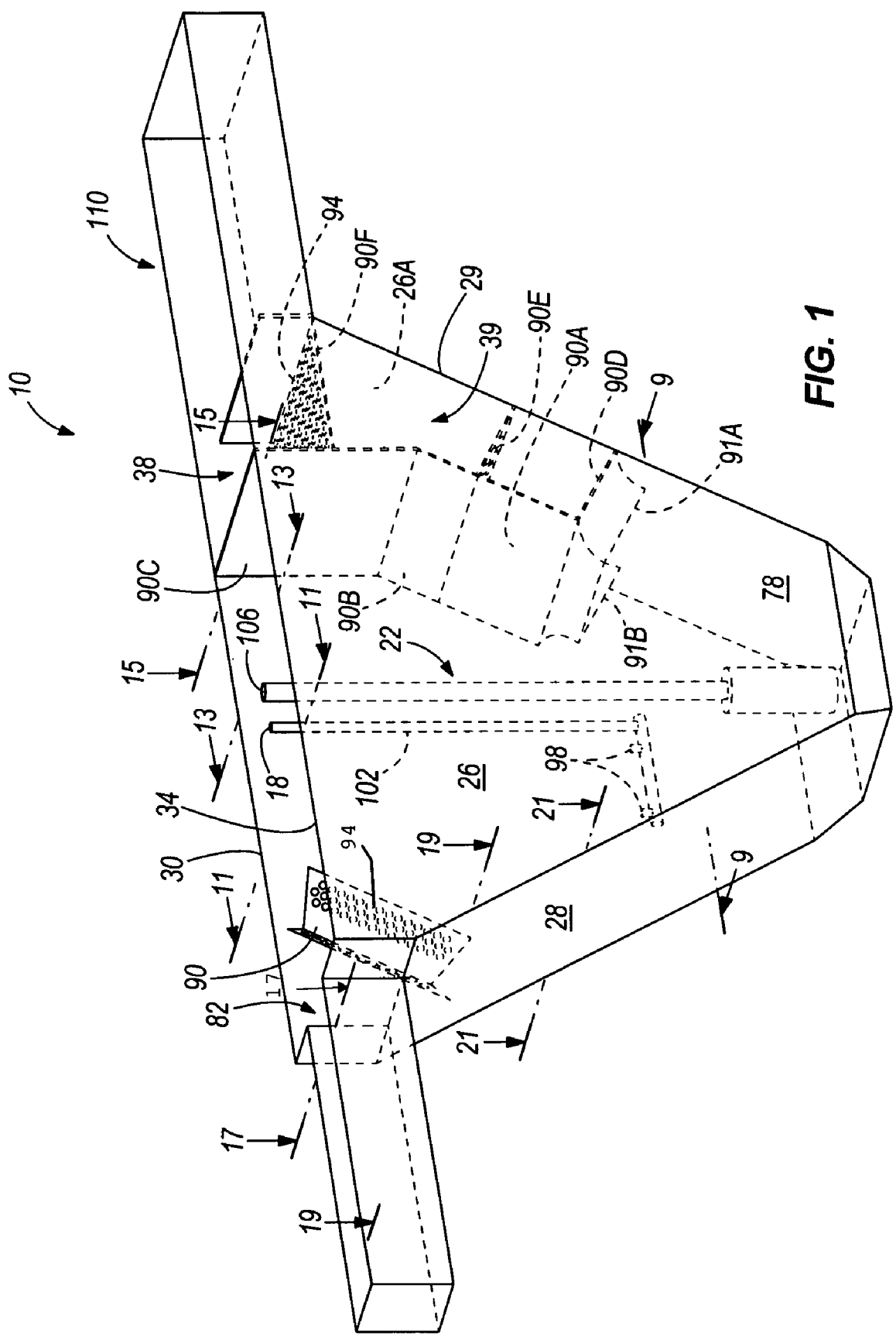
FIG. 1 is a front perspective view of a portion of one embodiment of the grit removal system of the present invention.
Figure 2:
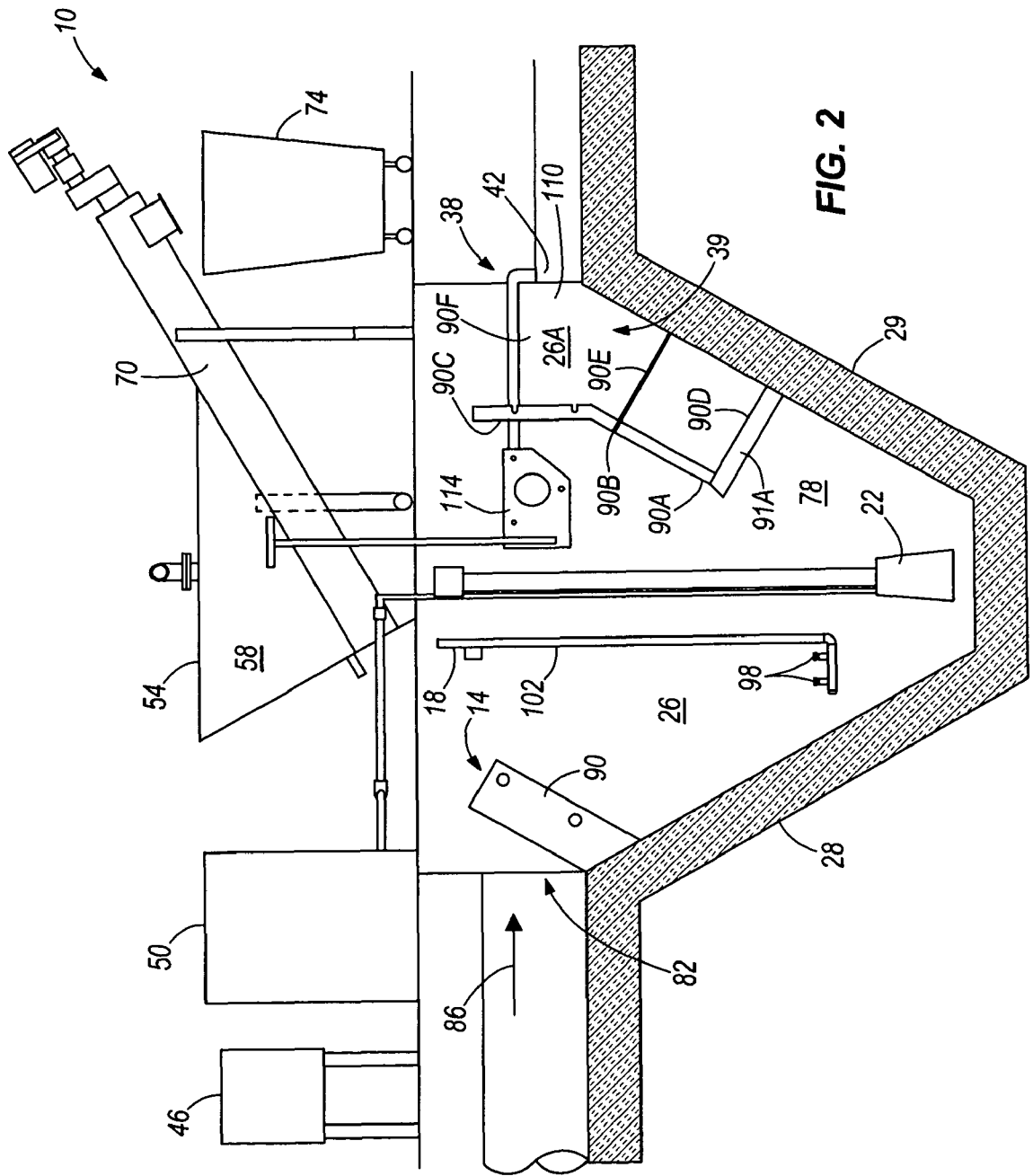
FIG. 2 is a side perspective view of the grit removal system.
Figure 3:
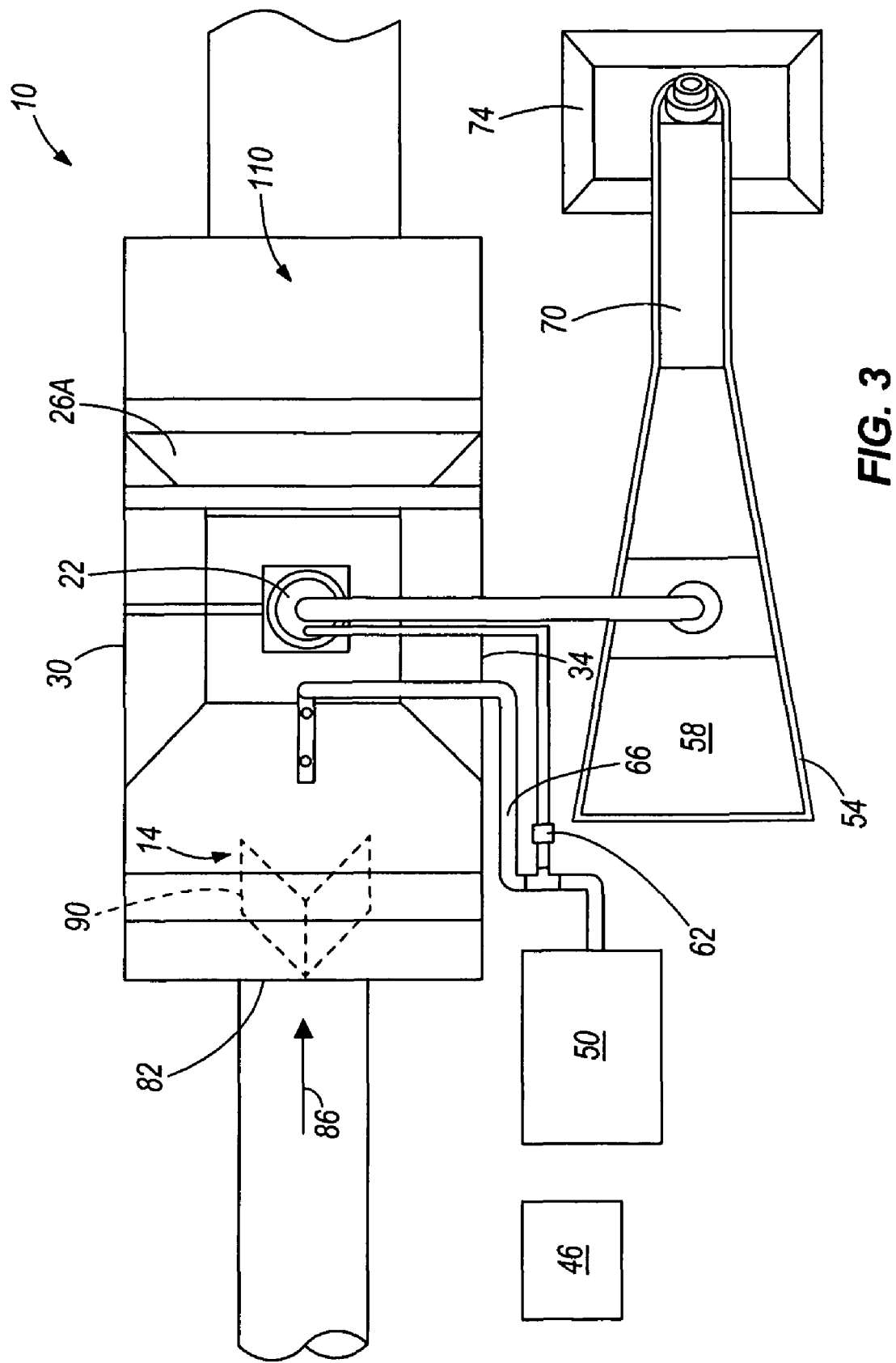
FIG. 3 is a plan view of the grit removal system of FIG. 2.
Figure 4:
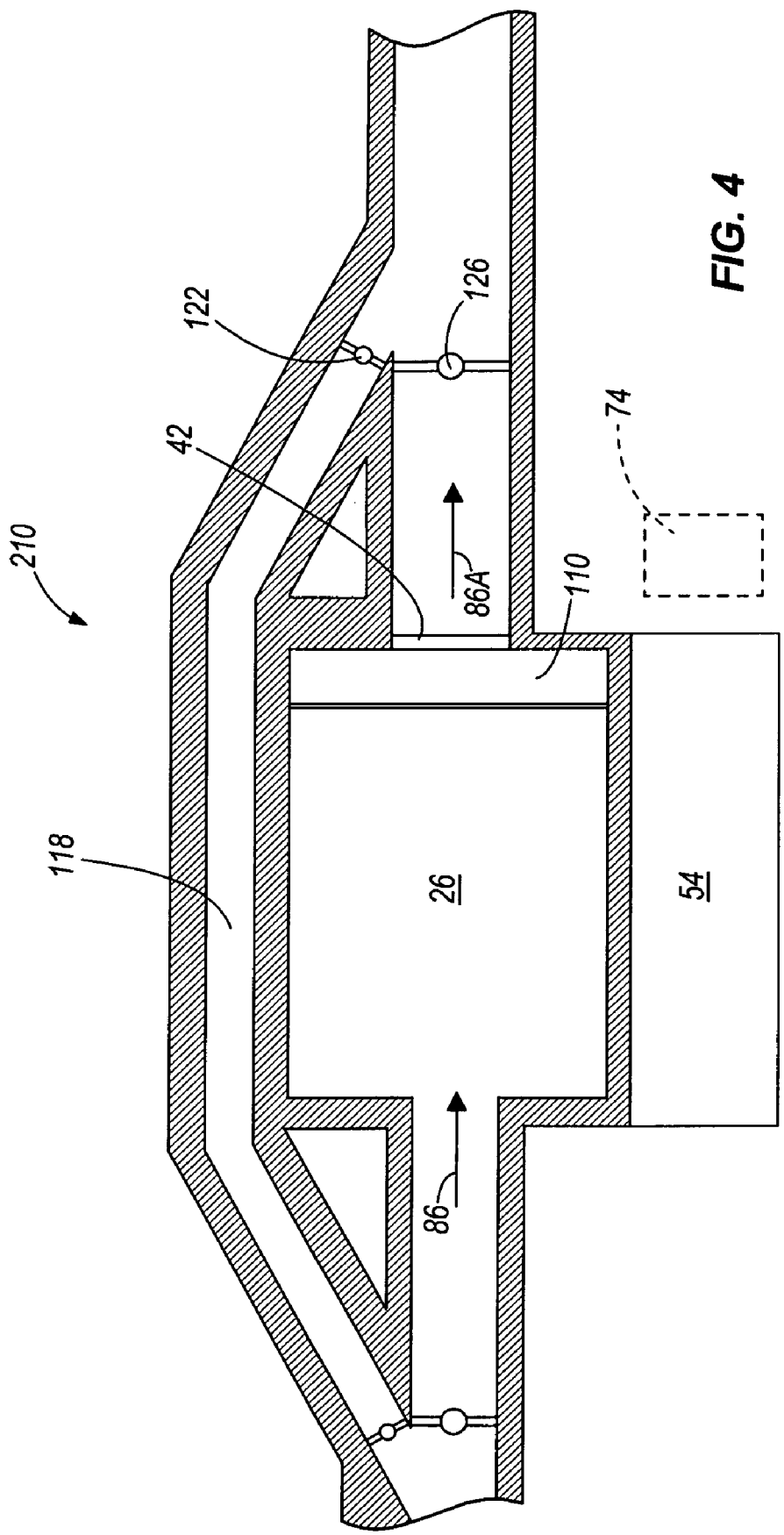
FIG. 4 is a side view of another embodiment of the grit removal system of the present invention showing a bypass arrangement.
Figure 5:
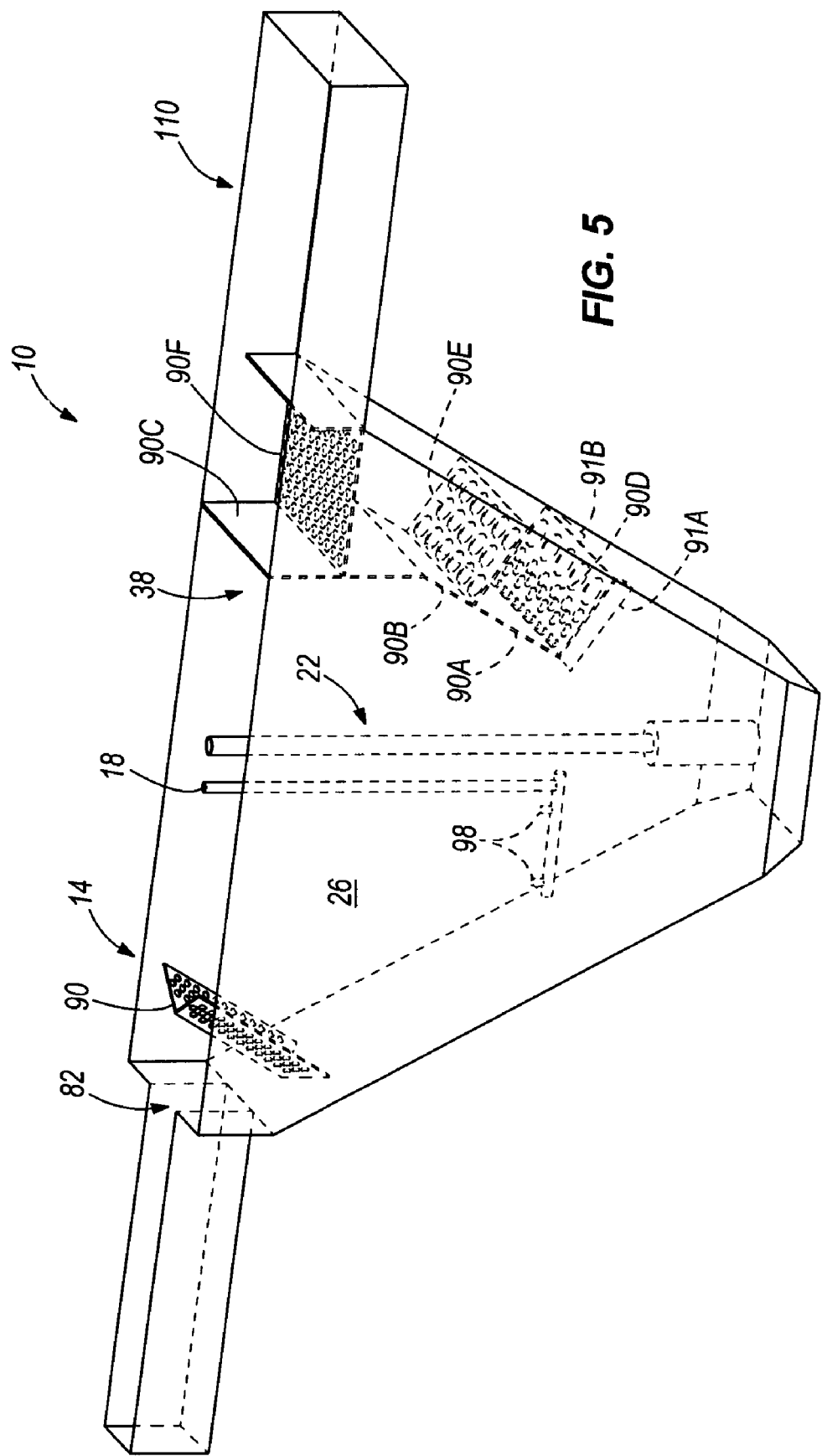
FIG. 5 is an isometric rotated side view of the grit removal system of FIG. 1.
Figure 6:
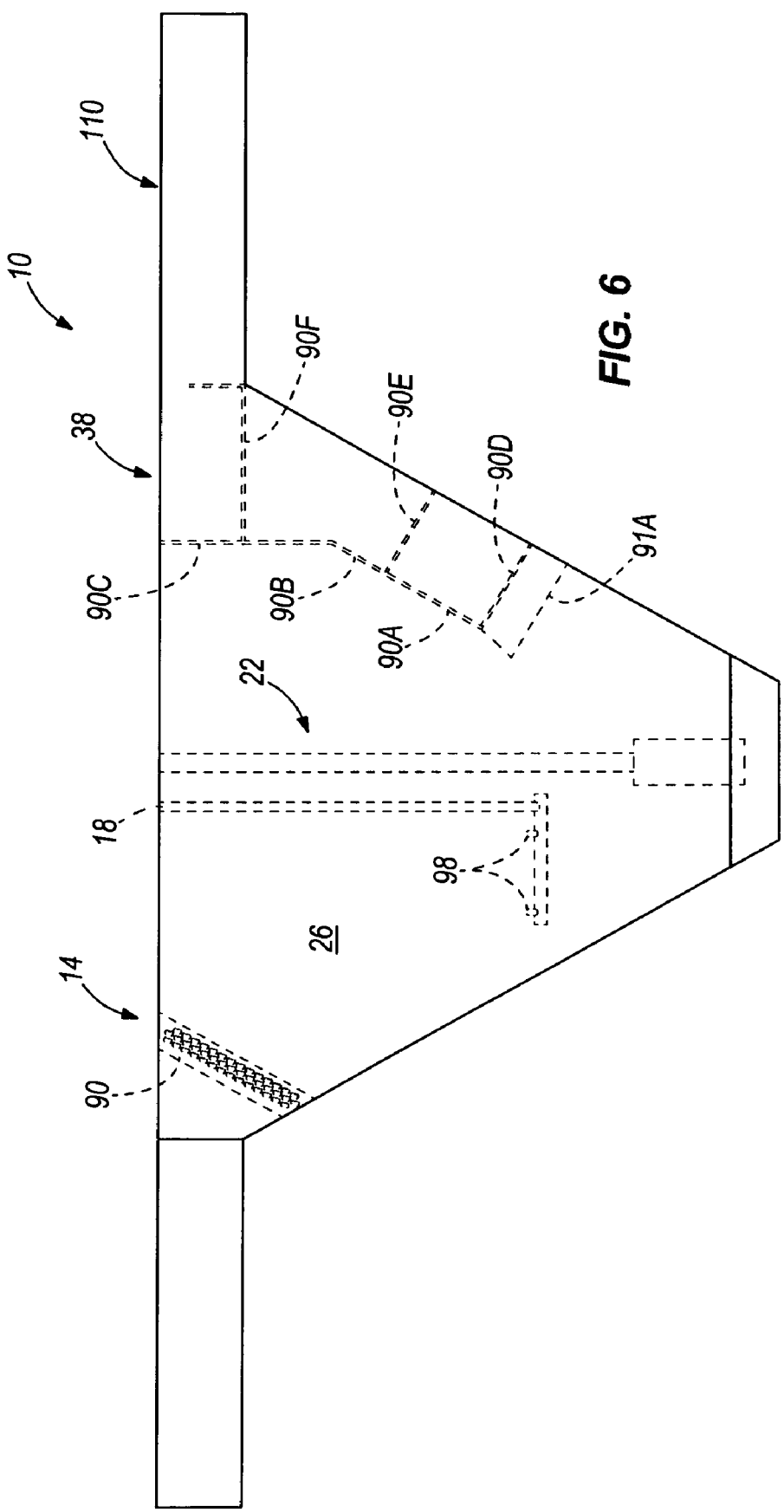
FIG. 6 is a solid modeling of an isometric side view of FIG. 1.
Figure 7:
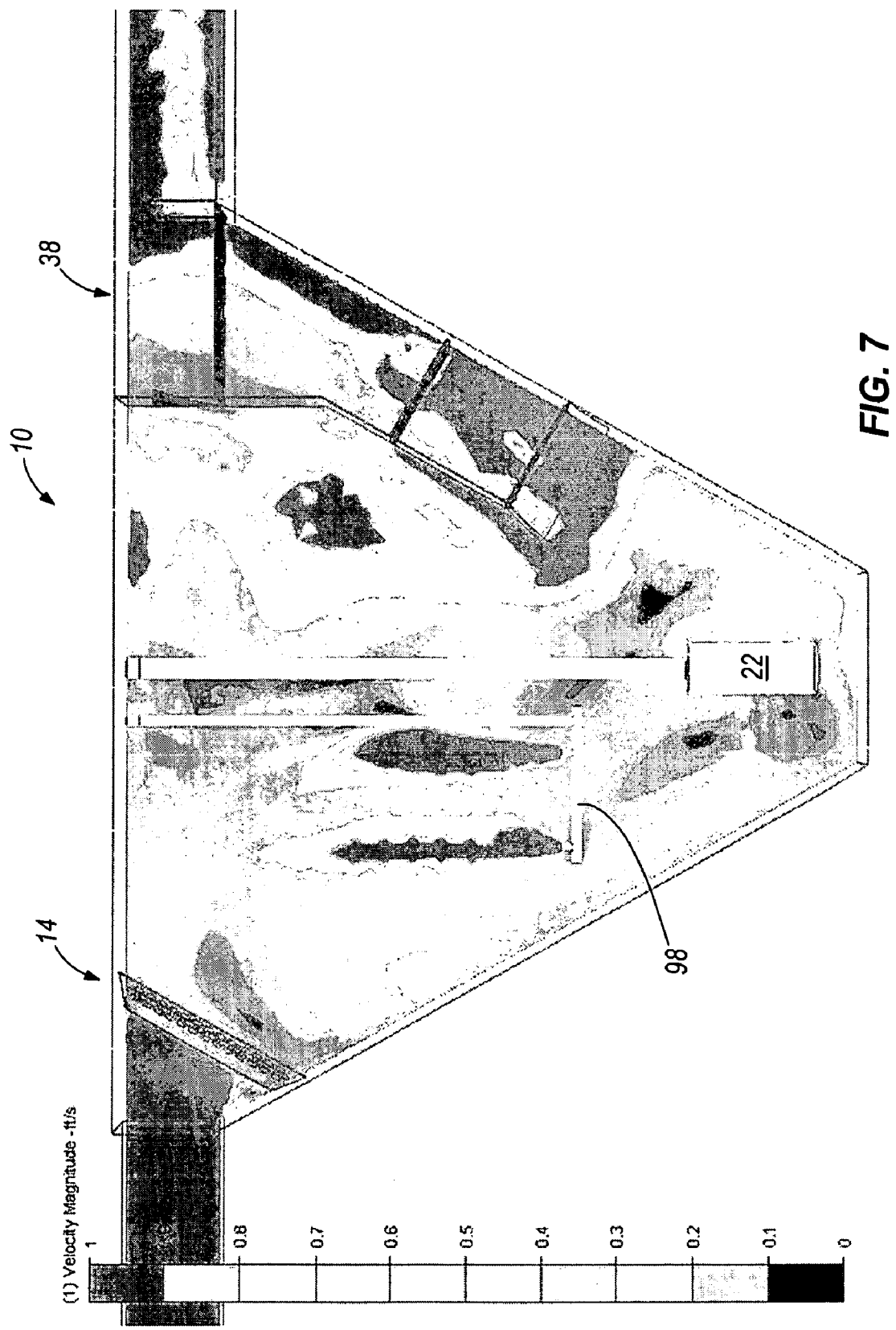
FIG. 7 is computational fluid dynamics plot of a side elevation view showing velocity magnitudes in feet per second.
Figure 8:
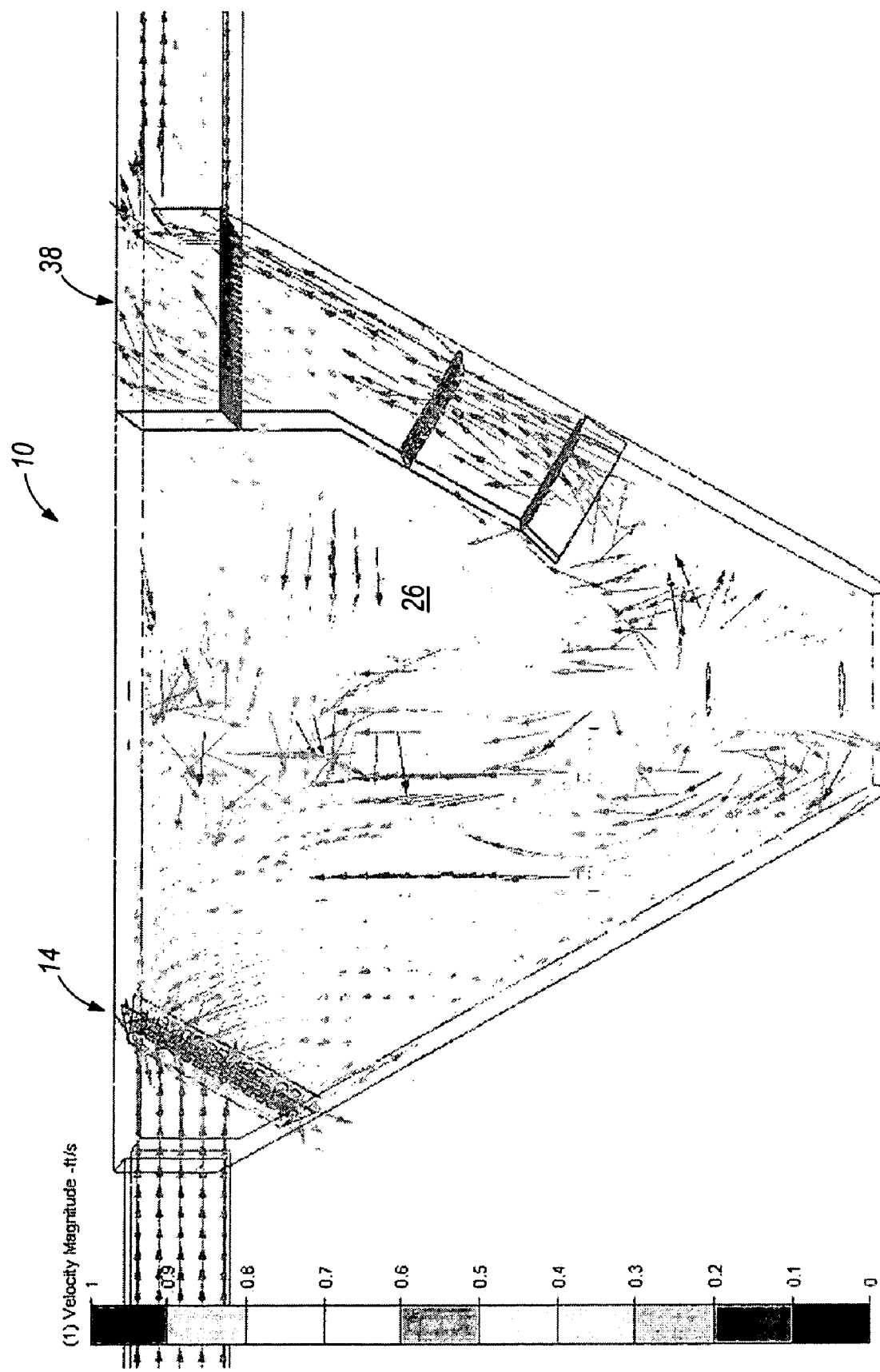
FIG. 8 is a velocity vector plot of FIG. 7.
Figure 9:
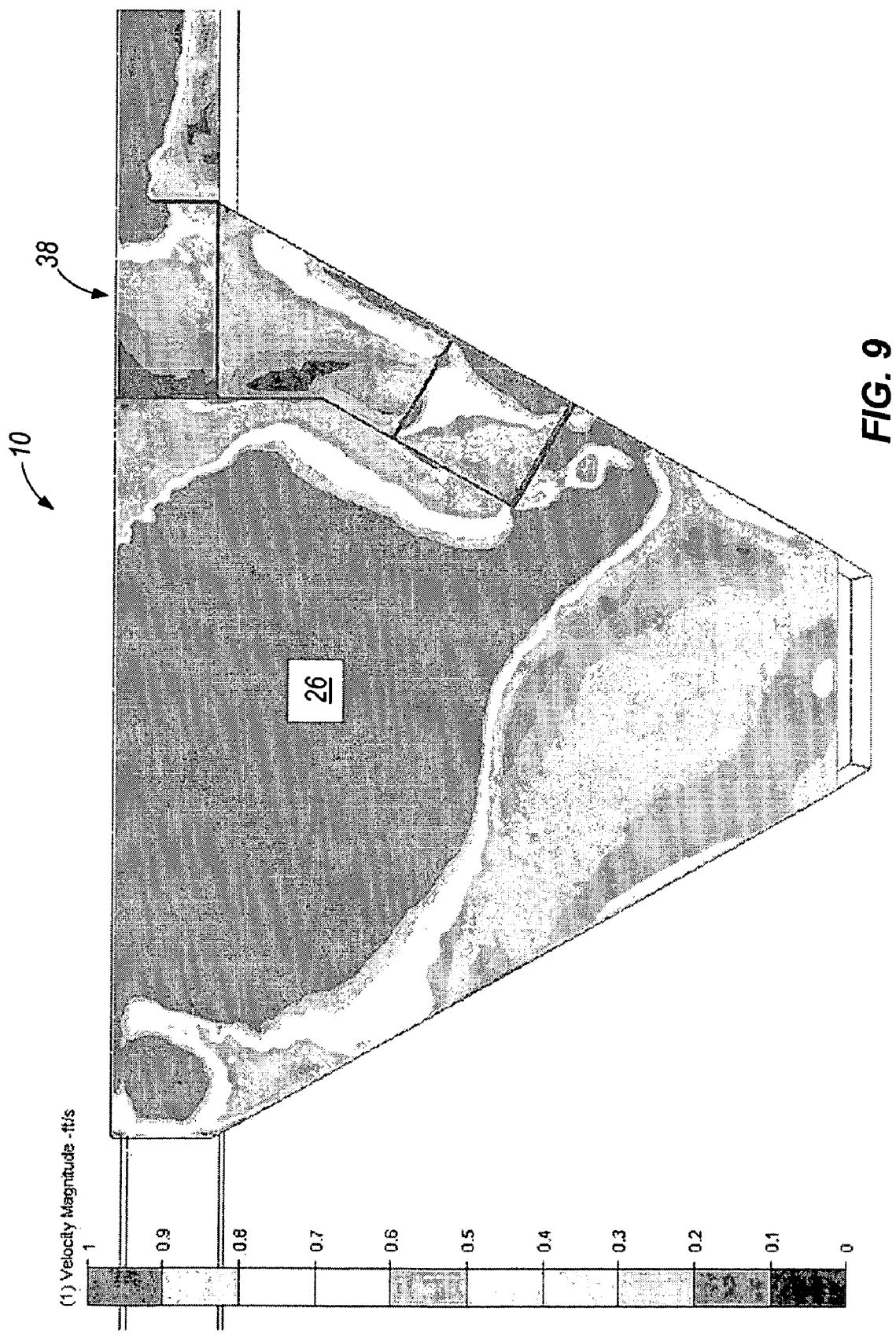
FIG. 9 is a computational fluid dynamics plot side elevation of FIG. 1 taken along line 9-9 illustrating velocity magnitudes in feet per second.
Figure 10:
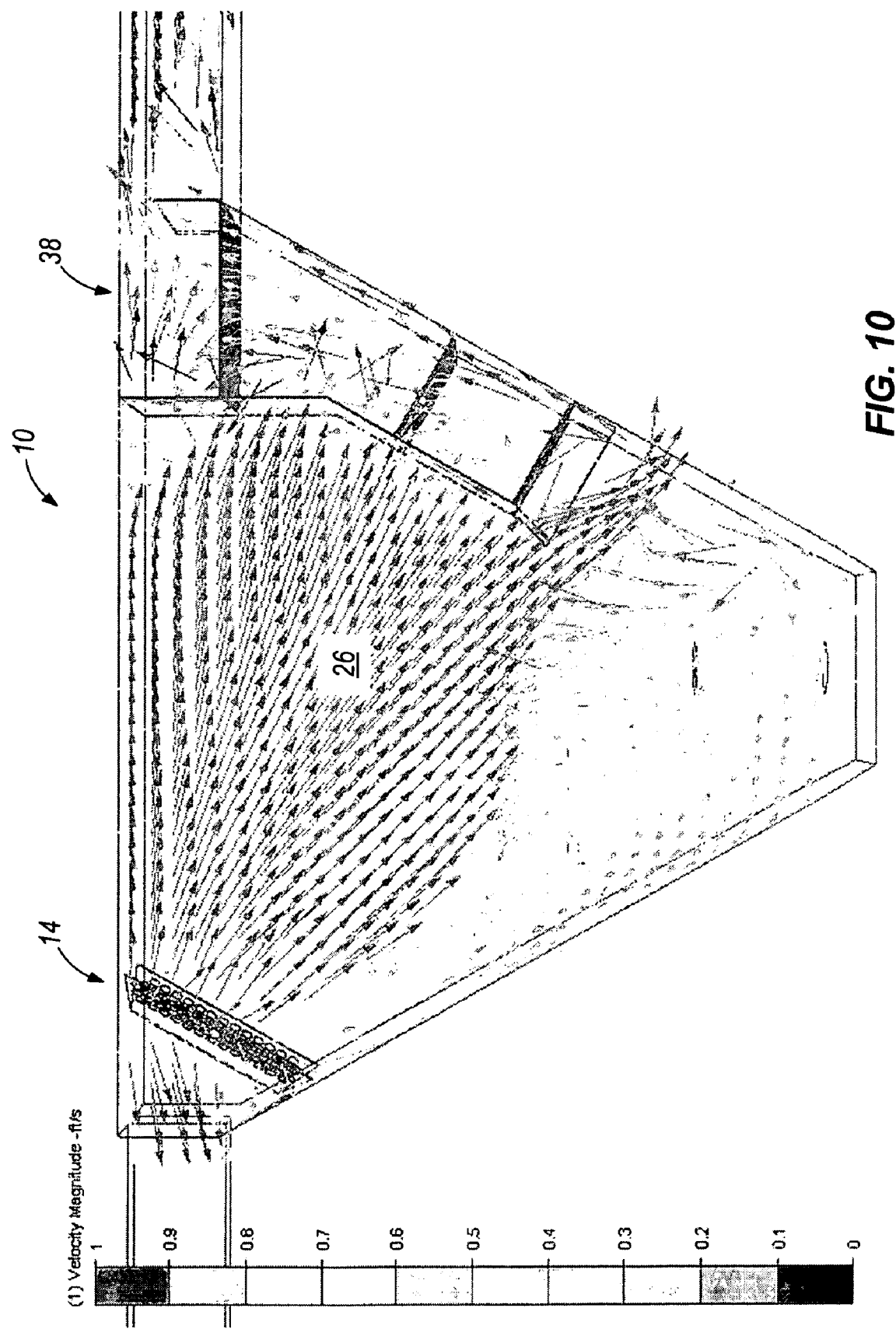
FIG. 10 is a velocity vector plot of FIG. 9.
Figure 11:
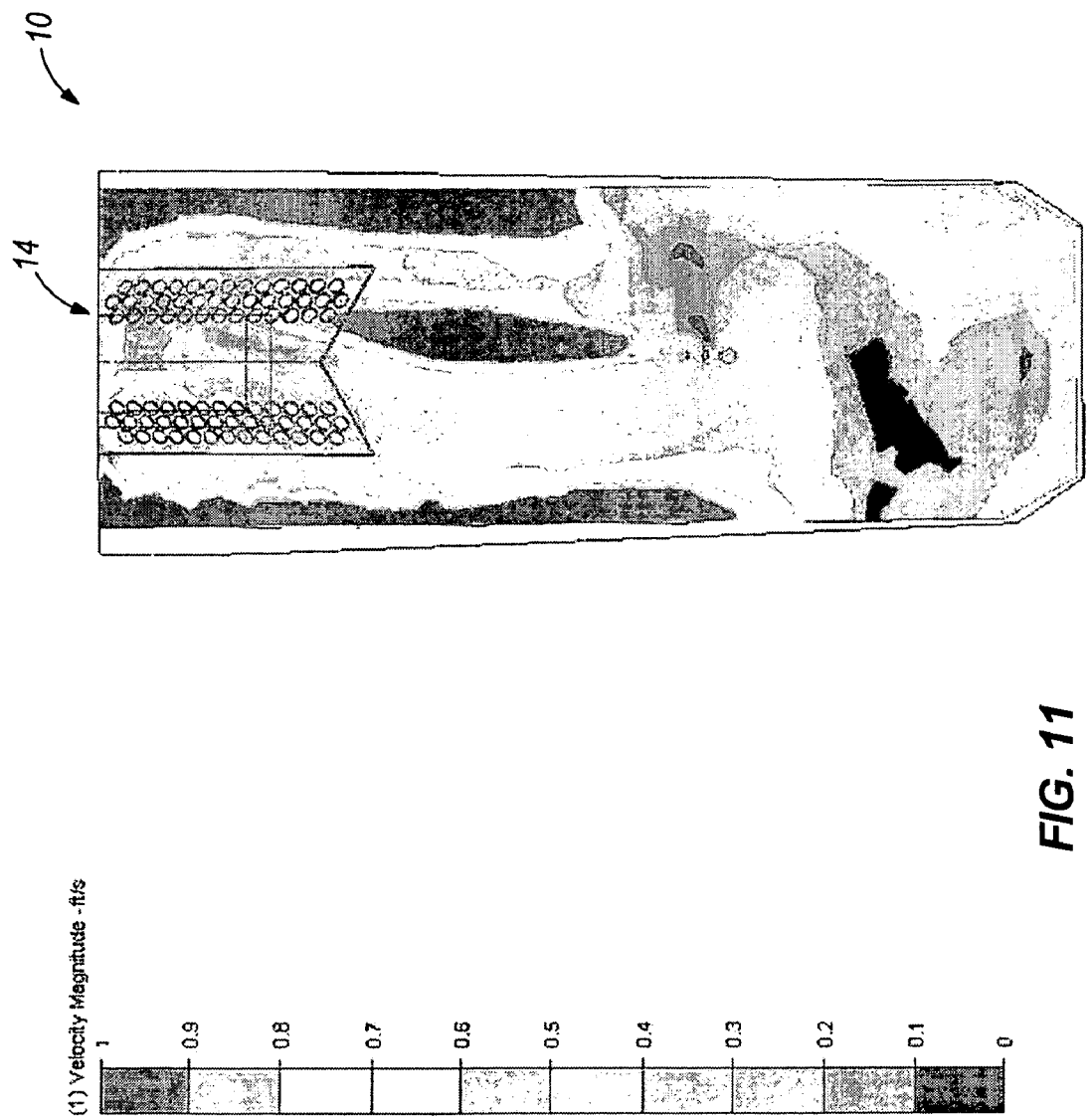
FIG. 11 is a computational fluid dynamics plot of a cross-sectional view of FIG. 1 taken along line 11-11 illustrating velocity magnitudes in feet per second.
Figure 12:
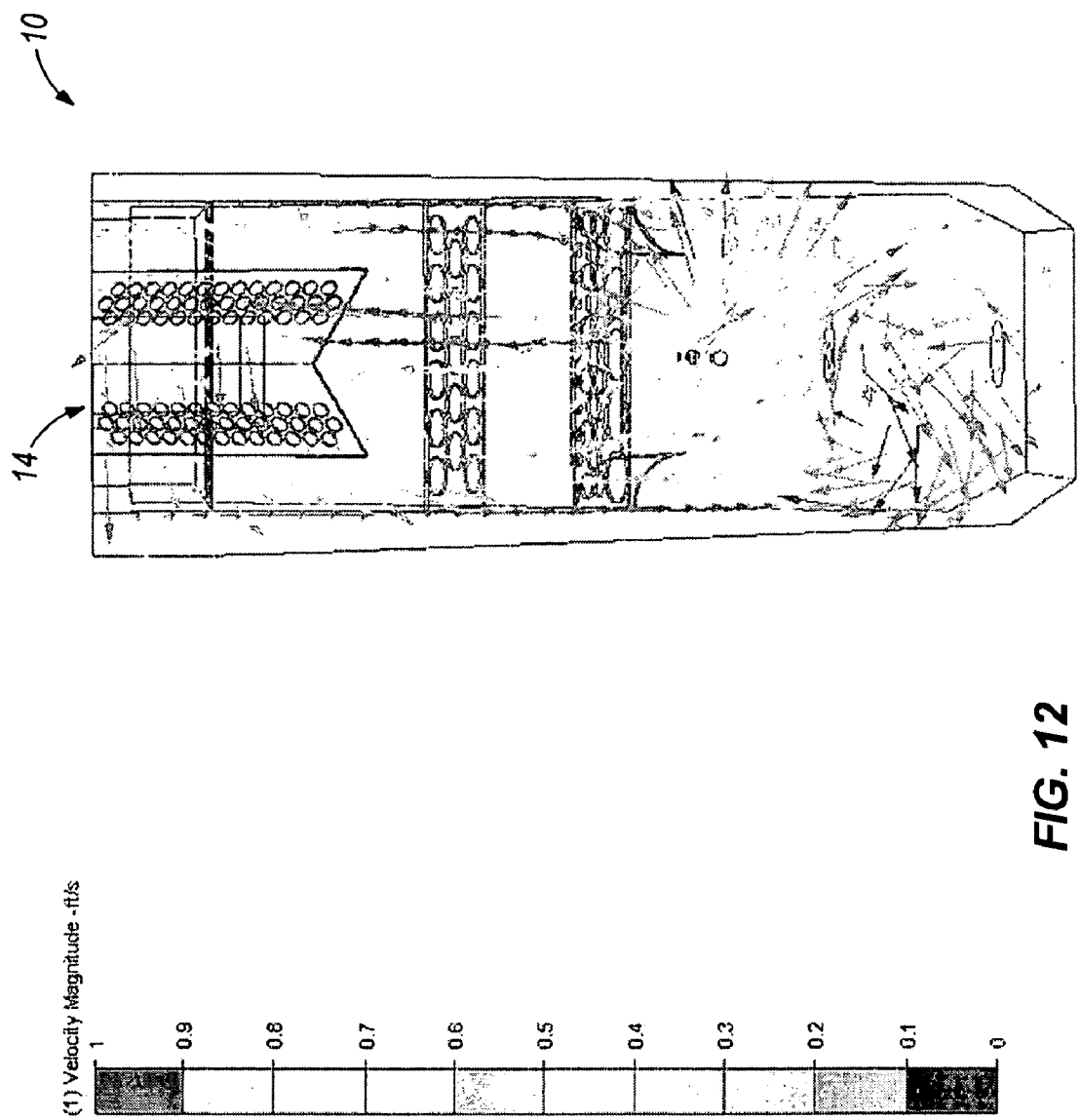
FIG. 12 is a velocity vector plot of FIG. 11.
Figure 13:
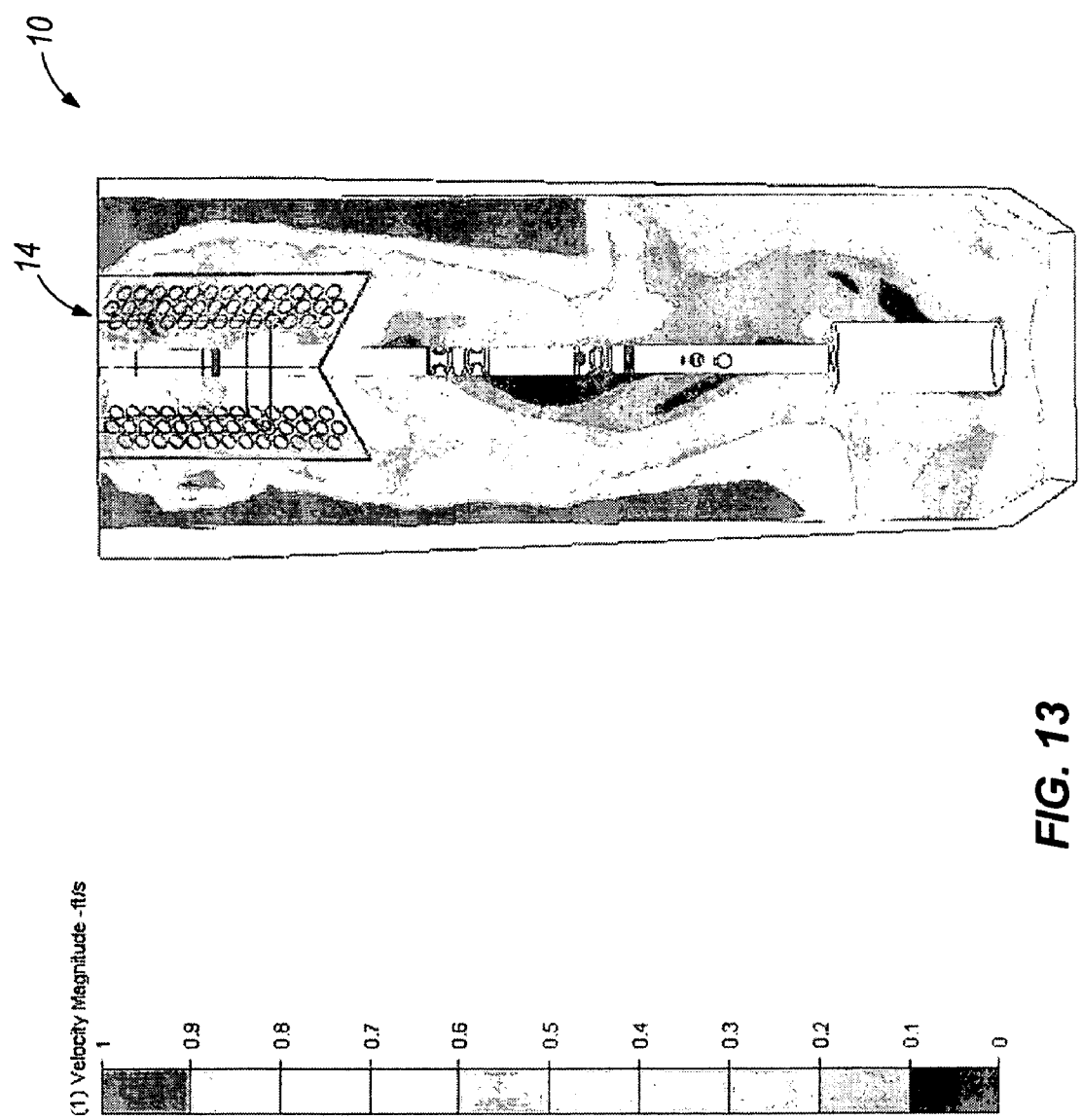
FIG. 13 is a computational fluid dynamics plot of a cross-sectional view of FIG. 1 taken along line 13-13 illustrating velocity magnitudes in feet per second.
Figure 15:
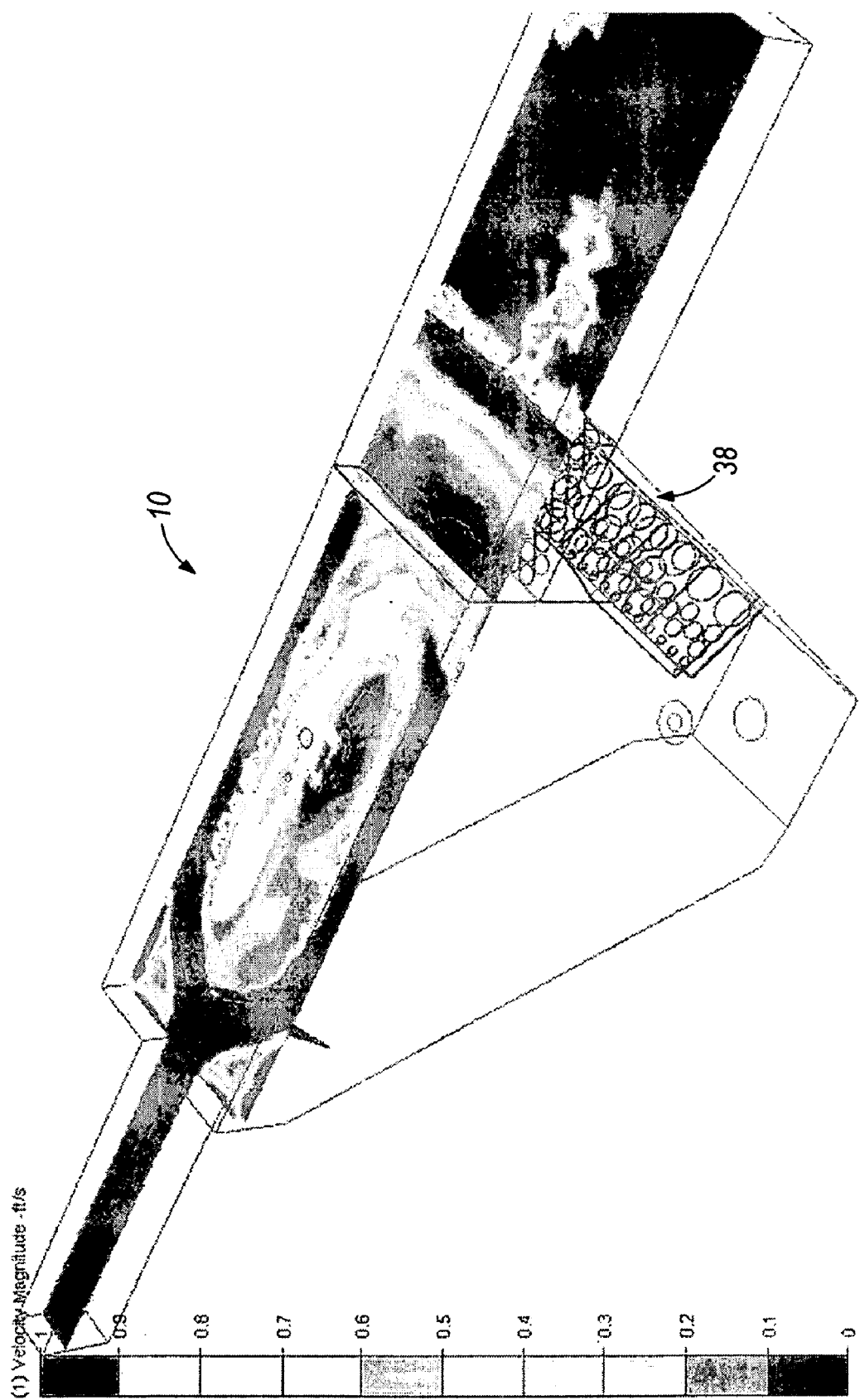
FIG. 15 is a computational fluid dynamics plot rotated view of FIG. 1 taken along line 15-15 illustrating a resulting flow pattern from inlet baffle, air header and rear baffle plate in velocity magnitudes in feet per second.
Figure 16:
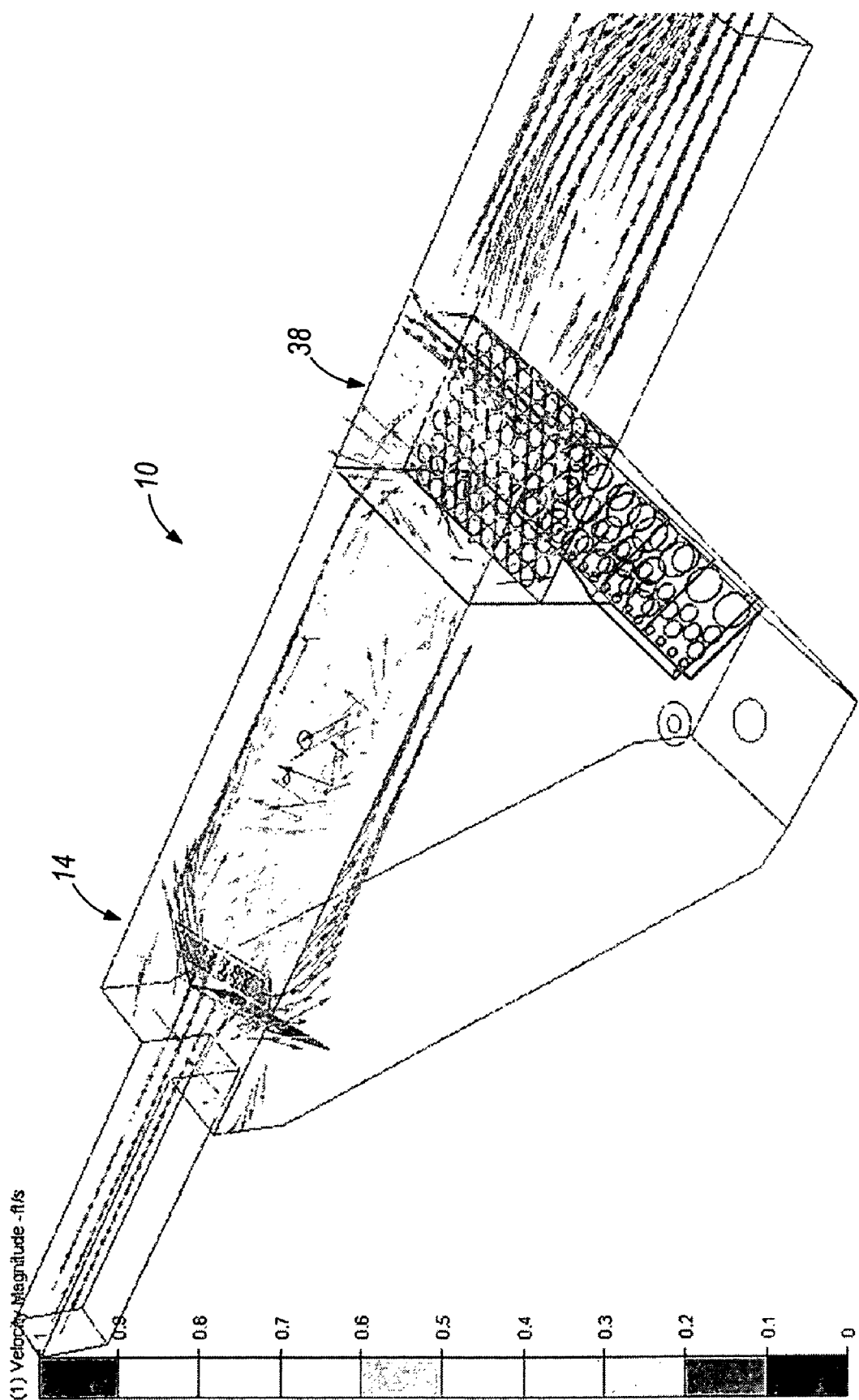
FIG. 16 is a velocity vector plot of FIG. 15.
Figure 17:
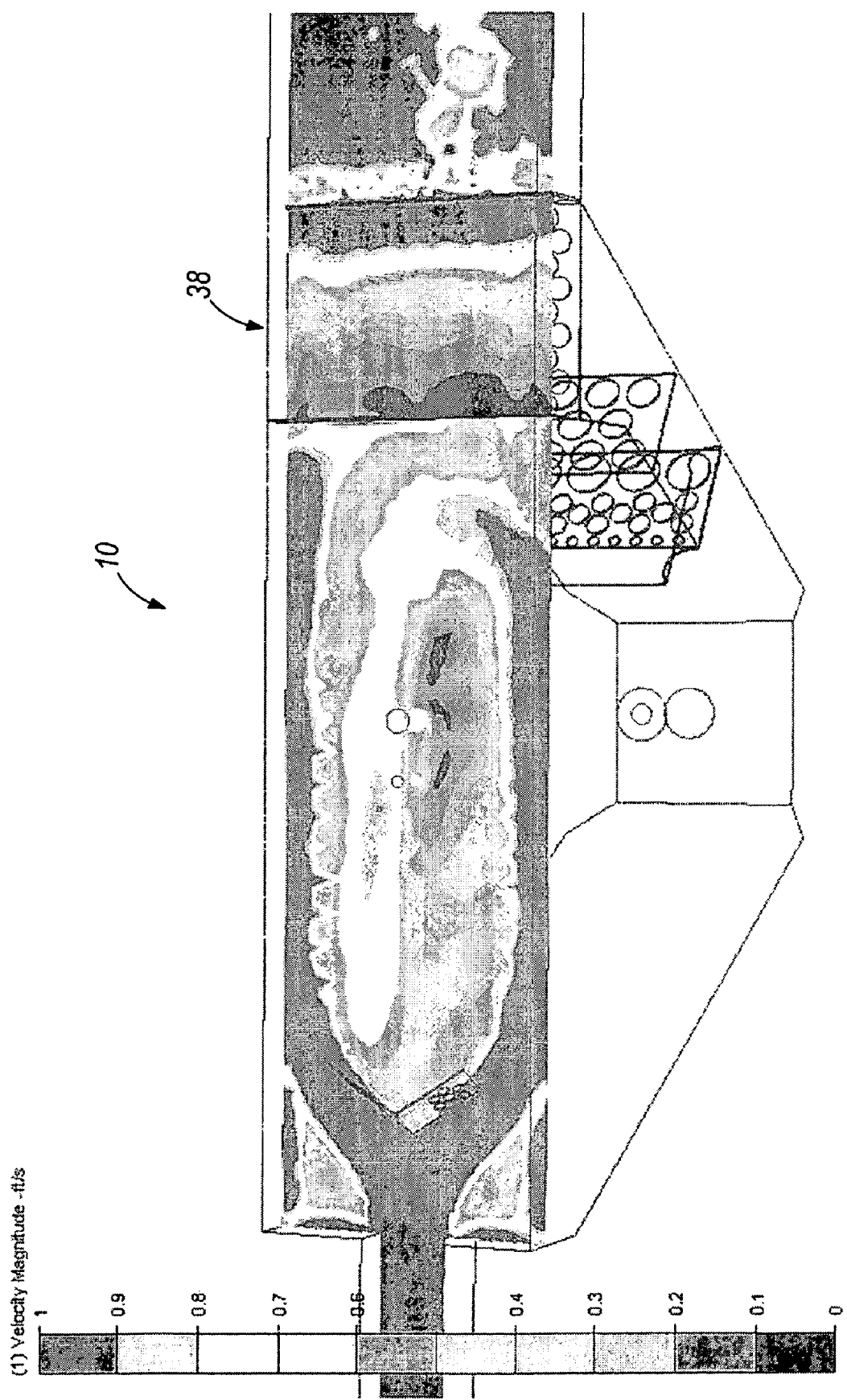
FIG. 17 is a computational fluid dynamics plot rotated view of FIG. 1 taken along line 17-17 illustrating a resulting flow pattern at inlet, aeration and outlet trough in velocity magnitudes in feet per second.
Figure 18:
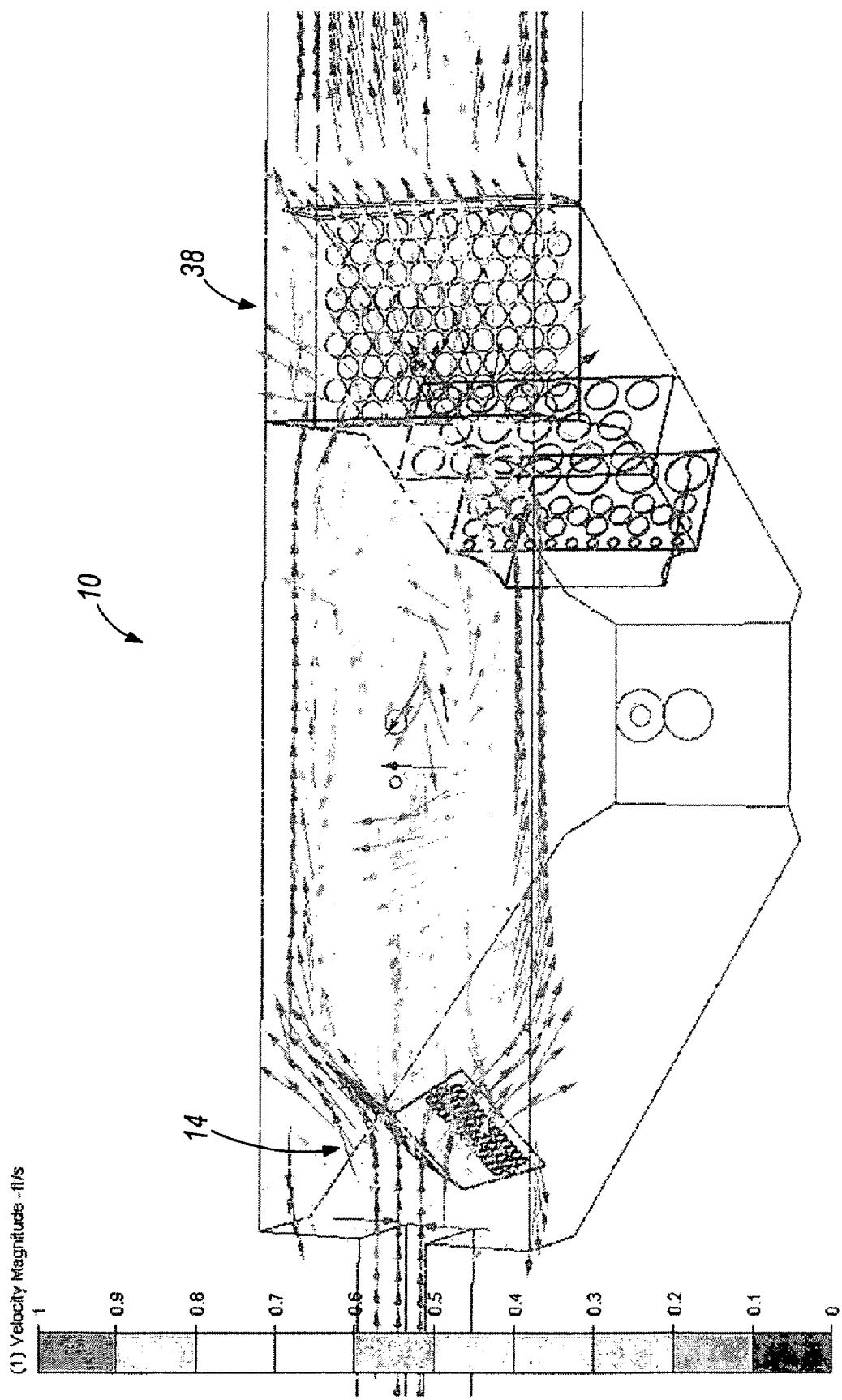
FIG. 18 a velocity vector plot of FIG. 17.
Figure 19:
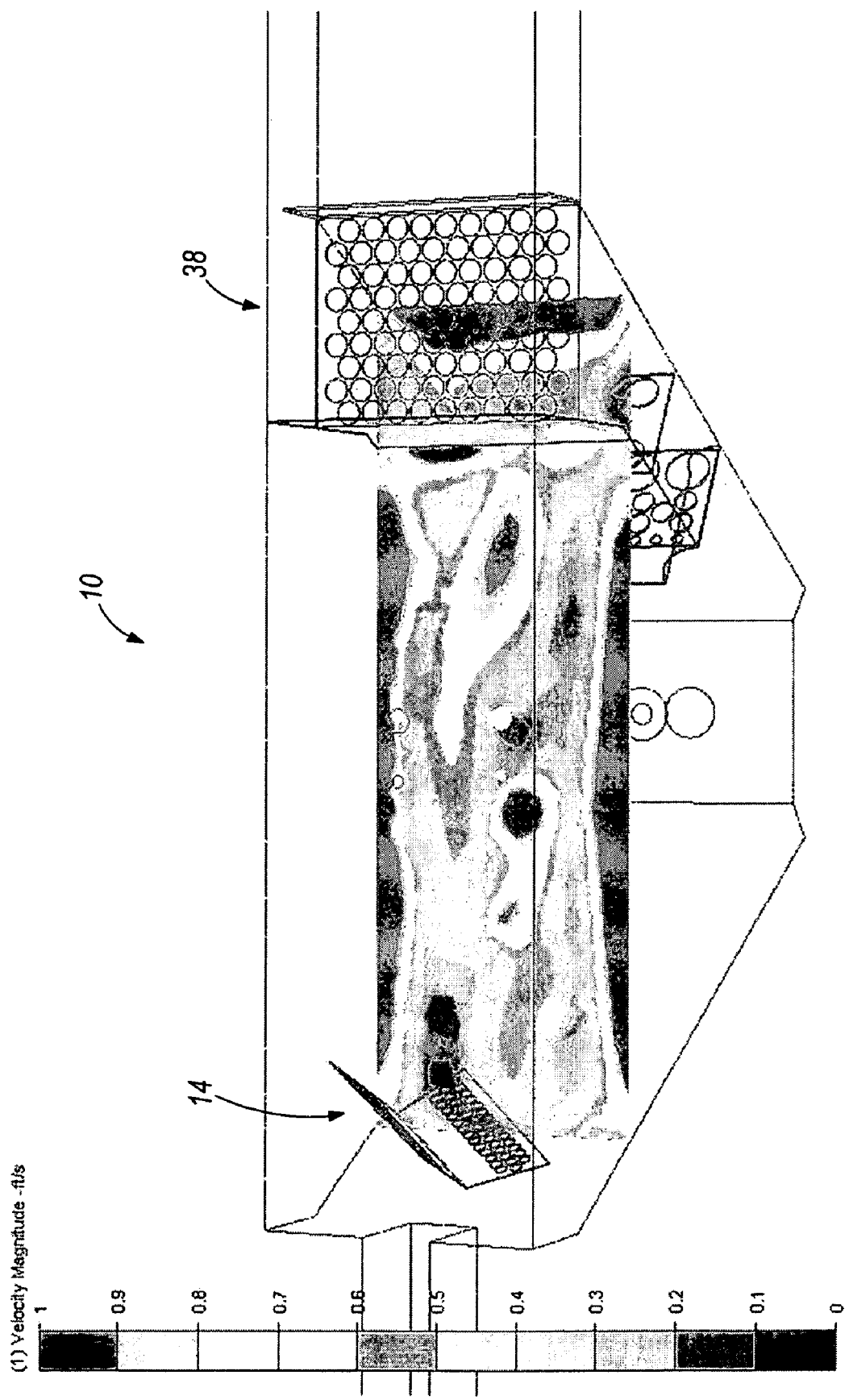
FIG. 19 is a computational fluid dynamics plot rotated view of FIG. 1 taken along line 19-19 illustrating flow patterns uninterrupted by water surface or inlet and outlet channels in velocity magnitude in feet per second.
Figure 20:
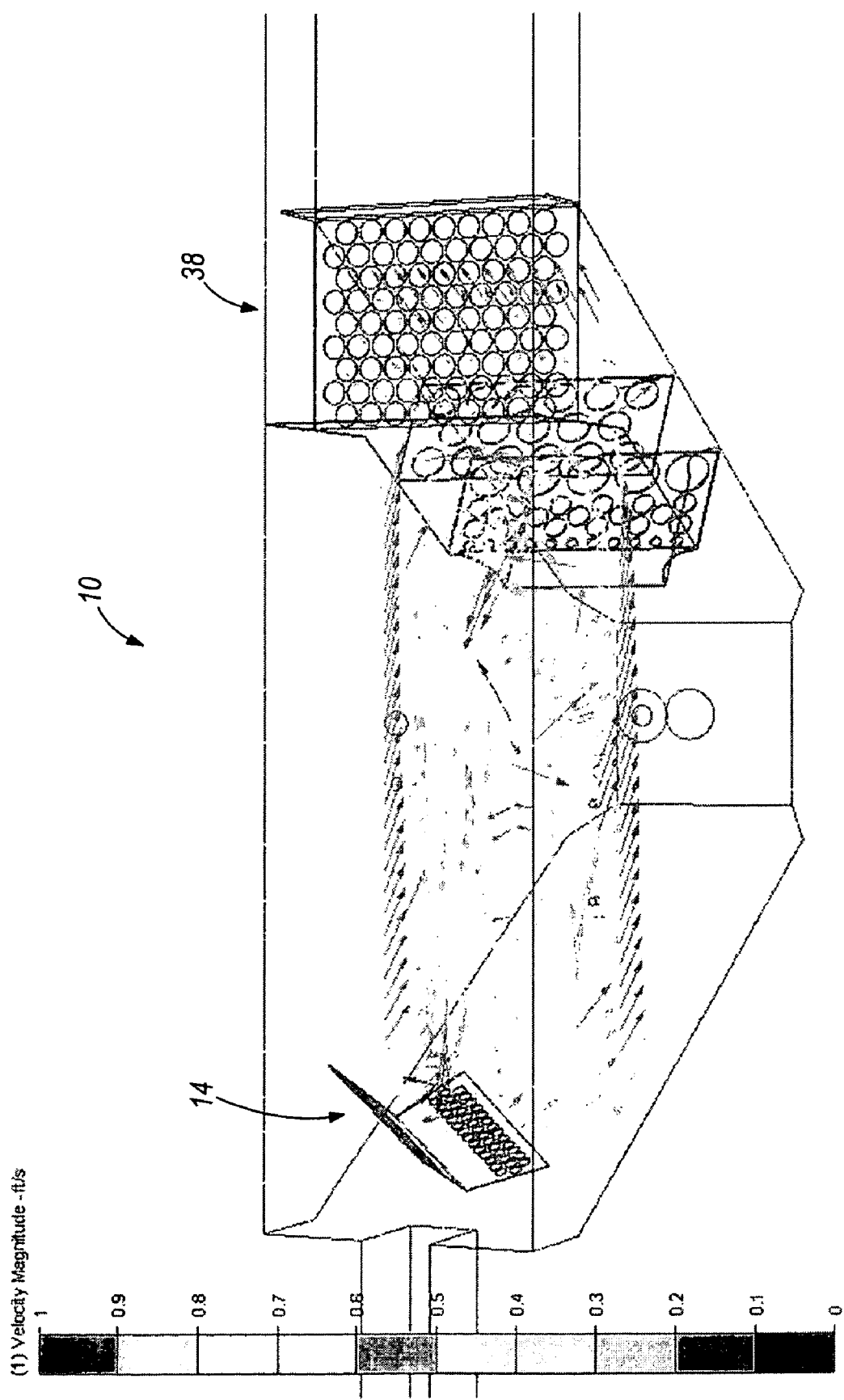
FIG. 20 is a velocity vector plot of FIG. 19.
Figure 21:
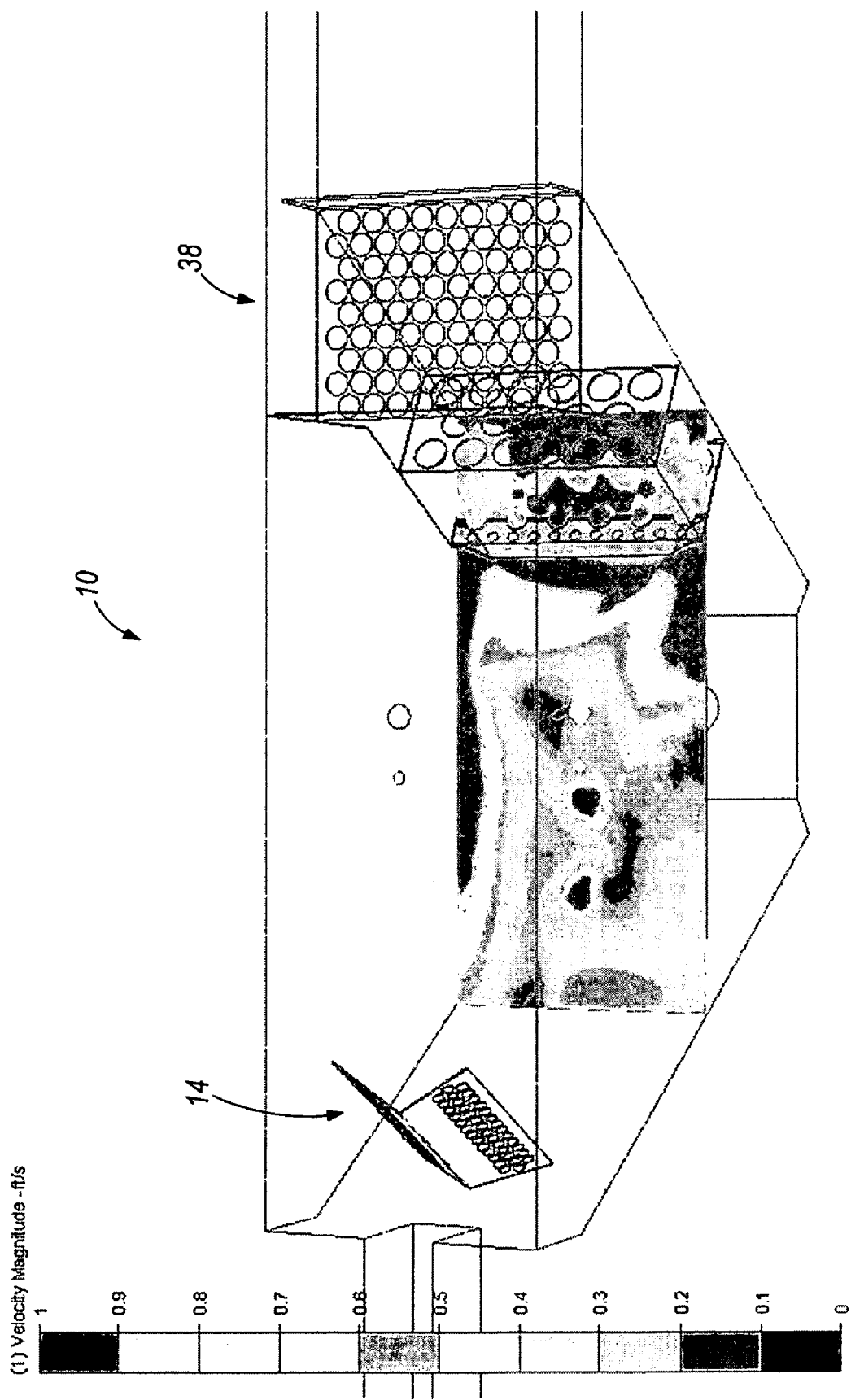
FIG. 21 is a computational fluid dynamics plot rotated view of FIG. 1 taken along line 21-21 illustrating resultant flow patterns in velocity magnitudes in feet per second.
Figure 22:
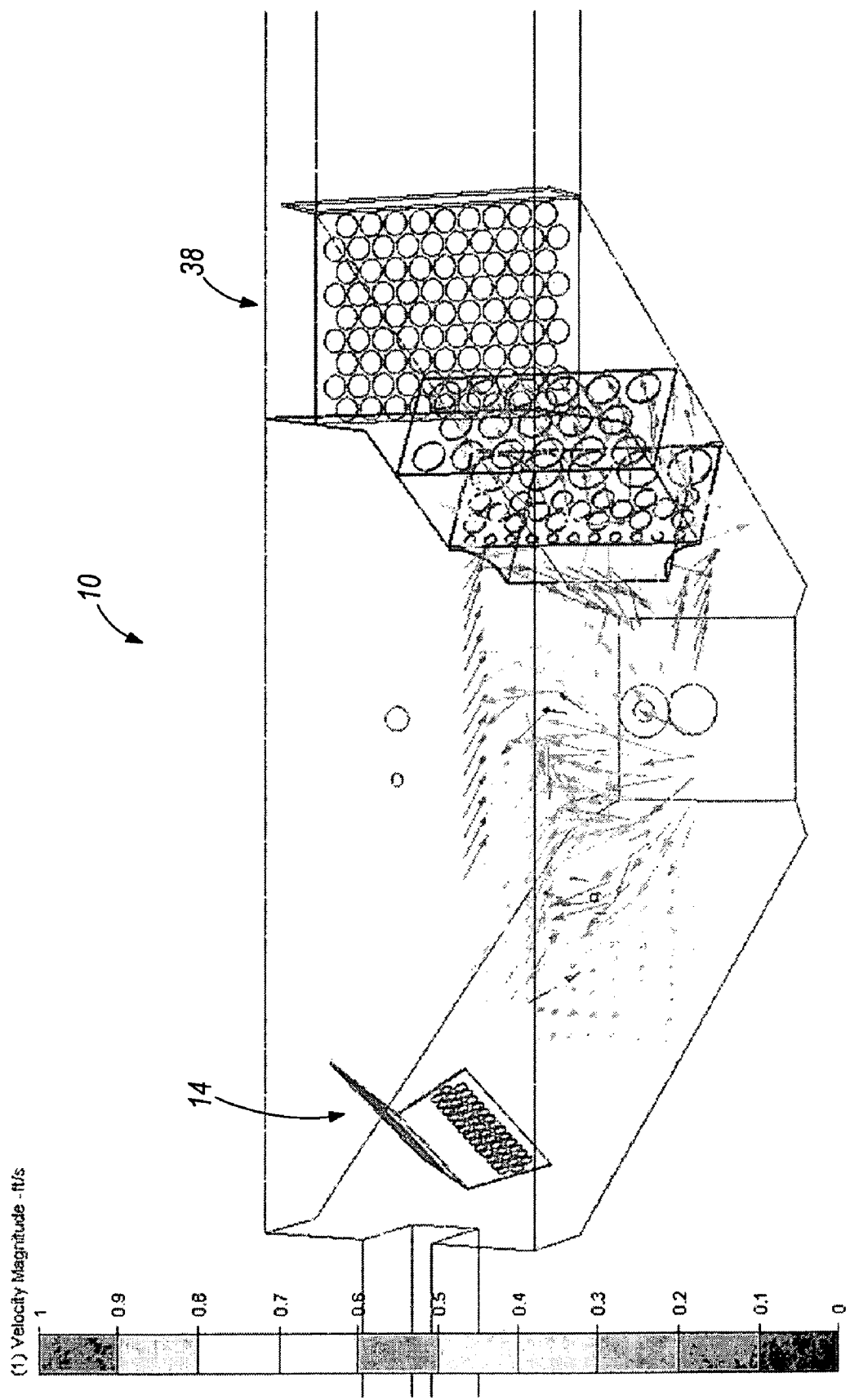
FIG. 22 is a velocity vector plot of FIG. 21.
Figure 23:
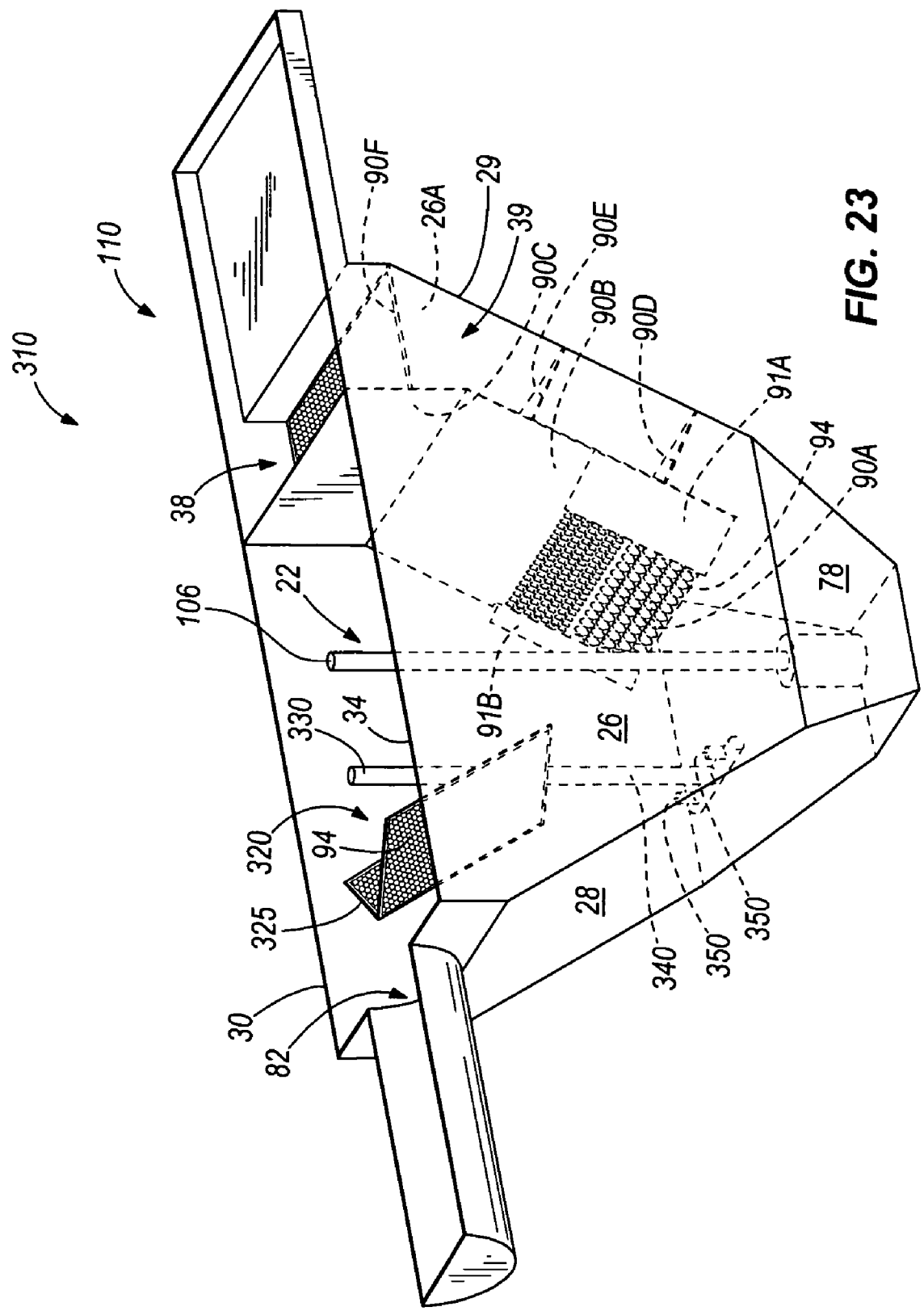
FIG. 23 is a front perspective view of a portion of another embodiment of the grit removal system of the present invention.
Figure 24:
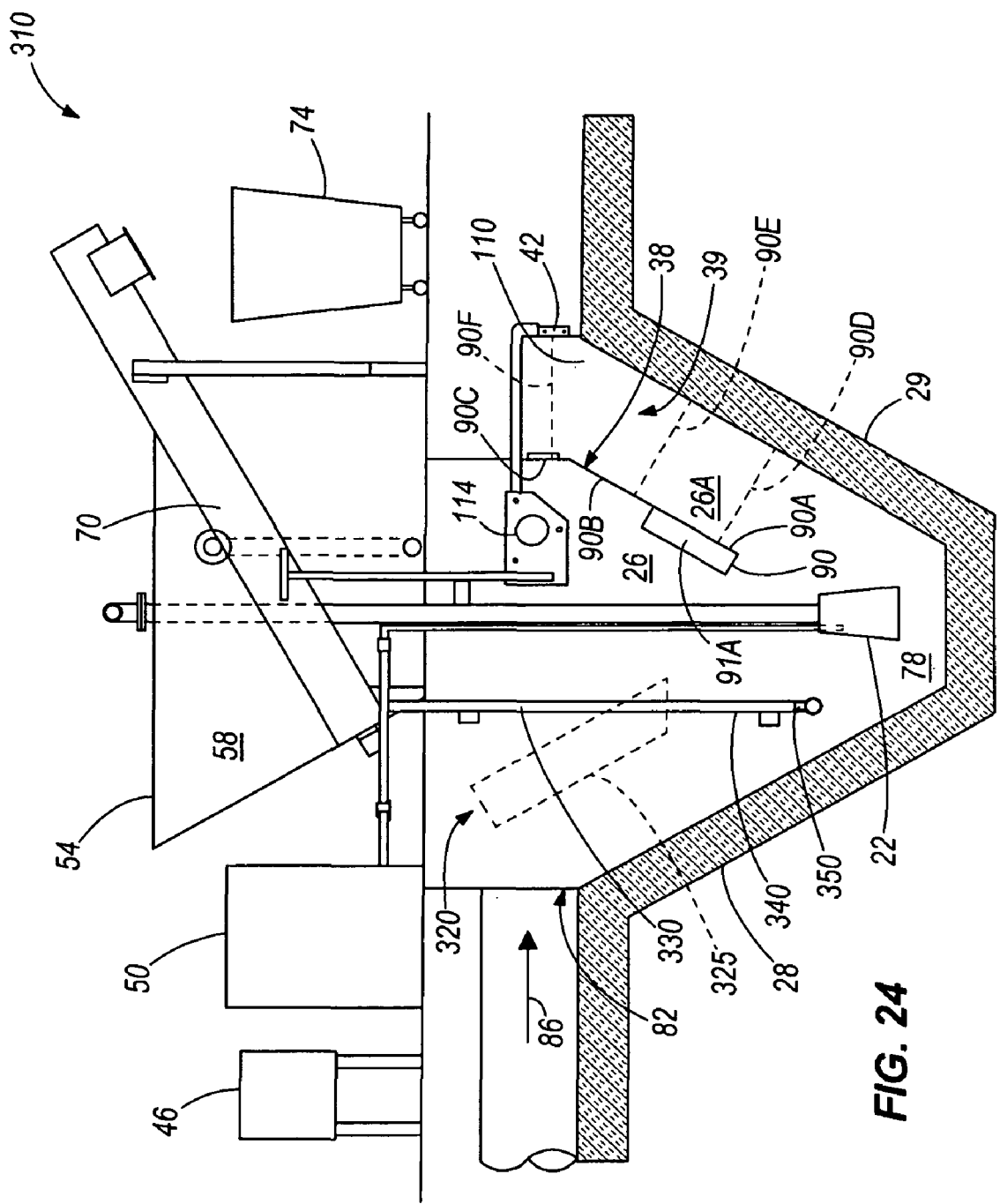
FIG. 24 is a side perspective view of the grit removal system of FIG. 23.
Figure 25:
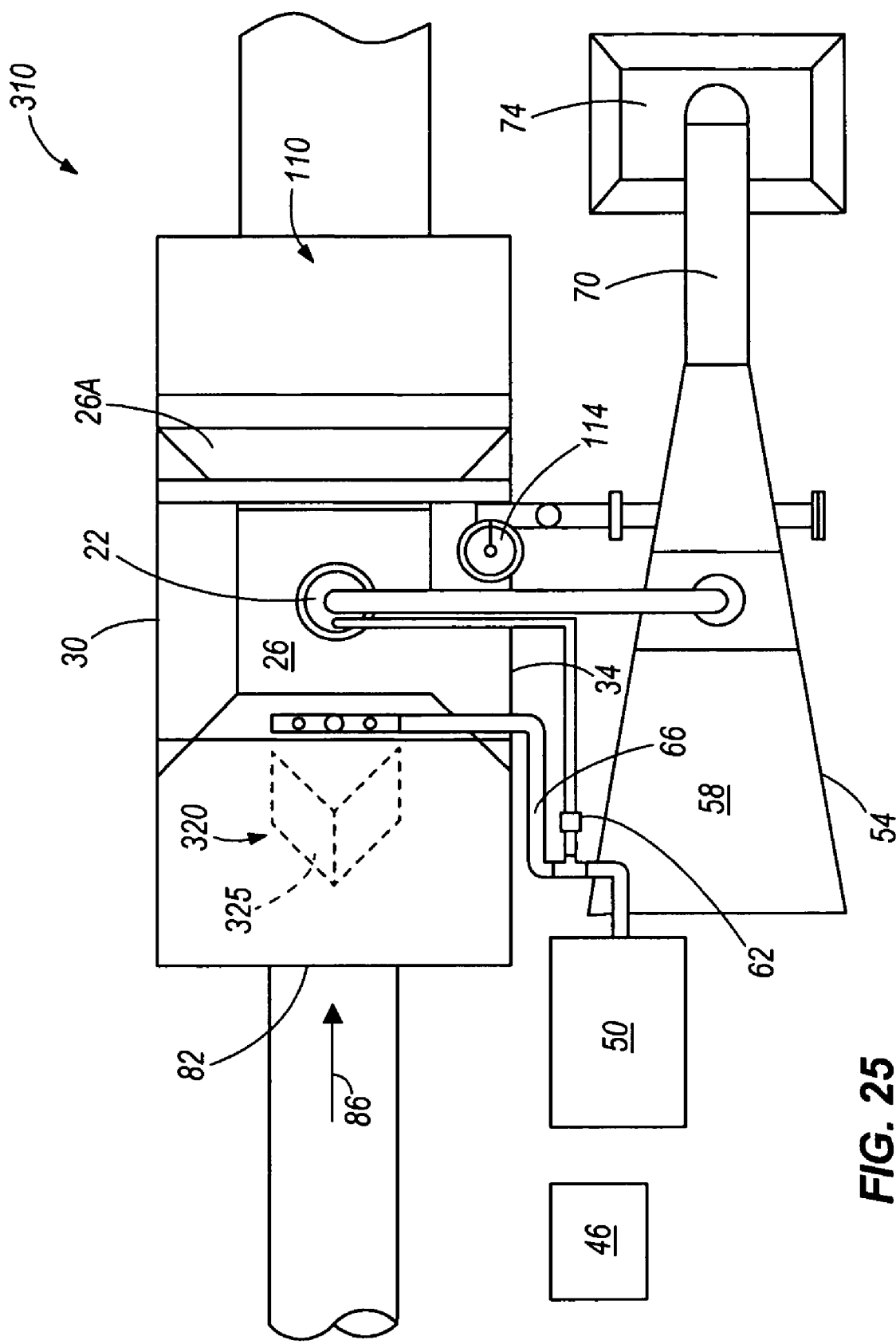
FIG. 25 is a plan view of the grit removal system of FIG. 24.
Figure 26:
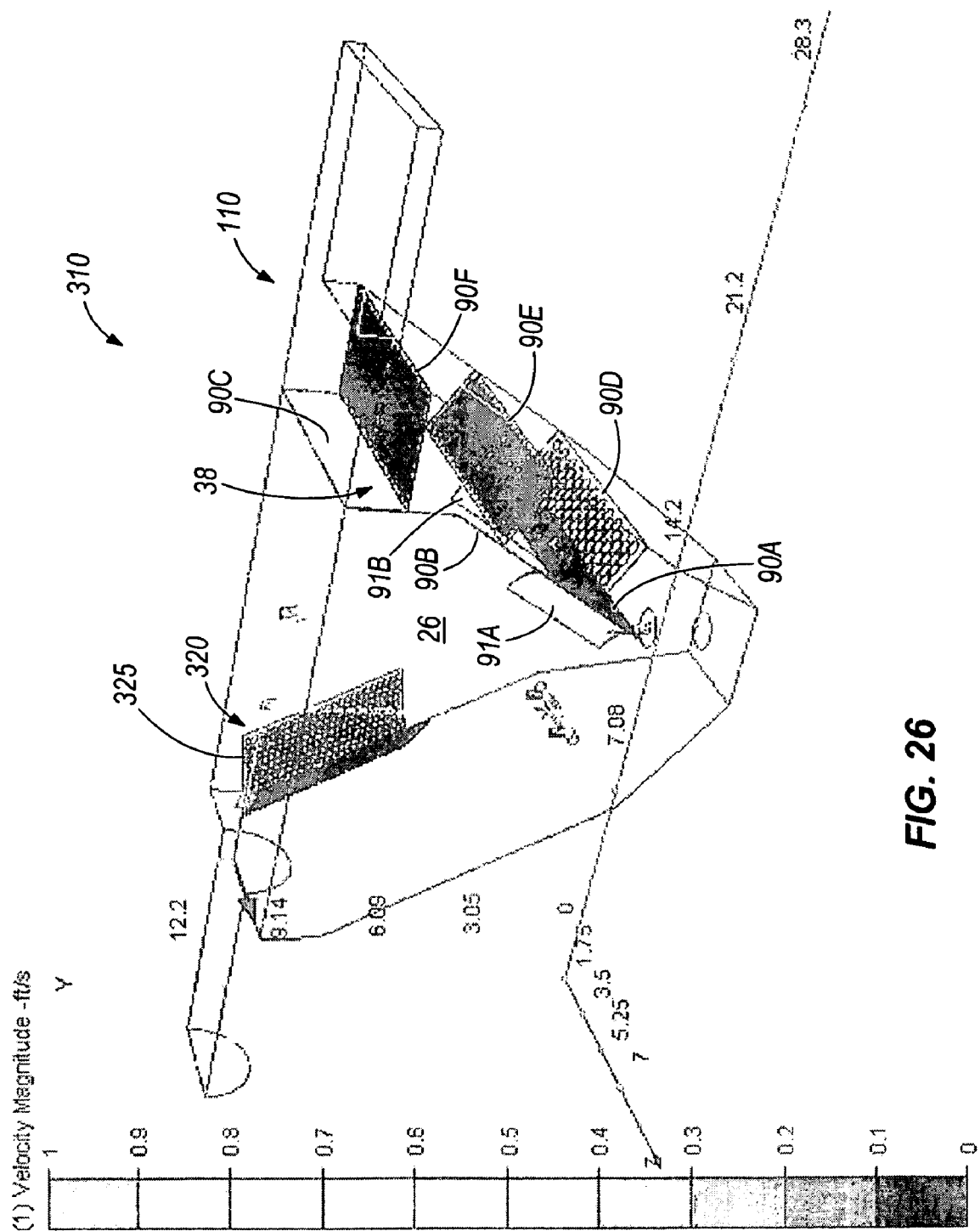
FIG. 26 is an isometric rotated side view of the grit removal system of FIG. 23.
Figure 27:
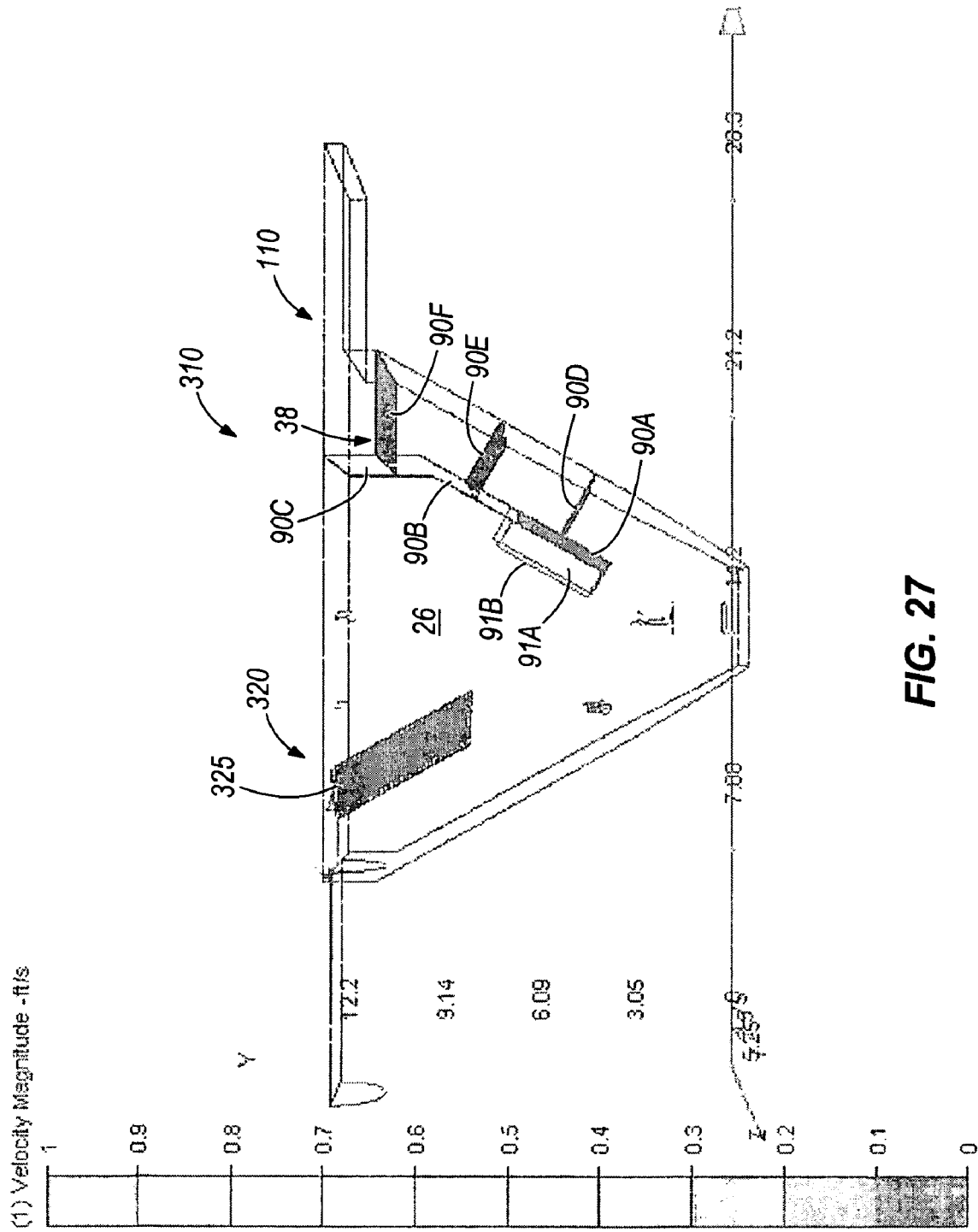
FIG. 27 is a solid modeling of an isometric side view of FIG. 23.

FIGS. 1-3 illustrate a grit removal system 10 having an inlet diffusion baffle assembly 14, an aeration header 18, a grit removal device 22, a basin 26 having a front wall 28, a rear wall 29, and sidewalls 30, 34, an outlet baffle assembly 38, and an adjustable outlet weir assembly 42. FIGS. 2-3 further illustrate the system including a control panel 46, a blower drive package 50, a grit washer 54, an upper tank 58, a butterfly valve 62, a throttling valve 66, a conveyor 70, and a receiving container 74. FIG. 4 illustrates another embodiment of a grit removal system 210 when utilized with a bypass channel. FIGS. 5-22 illustrate various characteristics and properties associated with the flow patterns of the system. U.S. Pat. No. 6,997,328, the entire content of which is incorporated herein by reference, discloses additional structure and operational components associated with grit removal assemblies.

As shown in FIGS. 1-3, the basin, or tank 26 includes the front wall 28, the rear wall 29, sidewalls 30, 34 and a lower chamber 78. The basin 26 further includes an inlet 82 for an influent, or inlet flow stream 86 and an outlet 110 for the flow stream to exit the basin 26. The front wall 28 is sloped downwardly from the inlet 82 toward the center of the basin. The rear wall 29 slopes upwardly from the center of the basin toward the outlet 110. The basin 26 is shown as a triangular shape such that the base of the basin is narrower than the top of the basin. However, in other embodiments, the basin can be any shape to fit the footprint needs of the application. The inlet diffusion baffle assembly 14 is spaced from the inlet 82 and positioned such that the inlet diffusion baffle assembly 14 is substantially perpendicular to the front wall 28. In other embodiments, the inlet diffusion baffle assembly may be positioned at any other angle or slope with respect to the front wall. In still other embodiments, the inlet diffusion baffle assembly may be positioned nearer to or further from the inlet 82. The inlet diffusion baffle assembly 14 includes a redirection plate, or baffle 90 configured to substantially immediately simultaneously direct inlet flow from the inlet 82 toward the tank sidewalls 30, 34 and into the lower portion of the basin 26. The baffle 90 is shown as being substantially V-shaped. However, in other embodiments, the baffle can be any shape including, but not limited to flat, curved, inverted V-shape, or other shape.

The redirection baffle 90 includes perforations 94 configured to aid in diffusion and rapid velocity reduction of the inlet stream. The perforations 94 also permit some flow of fluid through the baffle plates to further slow the velocity of the fluid flow while permitting grit removal. The inlet diffusion baffle assembly 14 is shown as including one baffle 90. However, in other embodiments, the inlet diffusion baffle assembly may include two, three or more baffles. The inlet diffusion baffle assembly can be constructed of metal, steel, or like material. Baffle 90 is shown as having a plurality of perforations 94 that are circular. However, the perforations may be any shape, such as including but not limited to triangular, square, rectangular, slits, other shapes, or any combination of shapes. The perforations may also be any size or combination of sizes.

An aeration header 18 with at least one diffuser 98 is located substantially below the redirection baffle 90. The aeration header 18 can include aeration piping 102. In some embodiments, the aeration header 18 includes a link-belt AdjustAir® header. The aeration header 18 causes fine bubbles to rise through the liquid in the basin to promote a rolling motion of the waste flow stream near the center of the basin. In other embodiments, the aeration header causes coarse bubbles to rise through the liquid to promote the rolling motion. The resultant rolling action promotes the settling and release of organics contained within the waste flow stream and attached to the grit particles. The rising air bubbles may also produce a scouring action behind the inlet redirection baffle 90 to keep the perforations clear of debris build-ups and blockage. The aeration header 18 is shown with two diffusers 98; however, in other embodiments, the aeration header can have one, three or more diffusers.

The rear 26A of the basin 26 includes an outlet baffle assembly 38 and an adjustable outlet weir assembly 42. As shown, the outlet baffle assembly 38 is spaced from the rear wall 29 to create a channel 39 between the outlet baffle assembly 38 and the rear wall 29. The outlet baffle assembly 38 includes redirecting plates, or baffles 90A, 90B, 90C, 90D, 90E, and 90F adapted to force the flow patterns toward the middle of the basin 26 and promote rapid velocity reduction of the fluid flow. Baffle 90A includes a plurality of perforations 94. The perforations 94 on baffle 90A decrease in size in a direction toward the outlet. However, in other embodiments, the perforations on baffle 90A can be any size or combination of sizes. Baffle 90A further includes wings 91A, 91B which further direct the fluid flow toward the center of the basin. Wings 91A, 91B can be of various shapes and sizes. In still other embodiments, one wing may be of a different size or shape than the other wing. In still other embodiments, baffle 90A may have only one wing or no wings. In still other embodiments, the wings 91A, 91B can be oriented at various angles with respect to baffle 90A.

Baffle 90B extends between baffle 90A and 90C. Baffle 90B is positioned at a substantially similar angle as baffle 90A; however, in other embodiments, baffle 90B may be at a different slope than baffle 90A. As illustrated, baffles 90A and 90B are positioned substantially parallel to the rear wall 29. Baffle 90C is positioned substantially perpendicular to the outlet 110 and extends vertically from baffle 90B. Both baffles 90B and 90C are illustrated as being solid baffles. However, in other embodiments, baffles 90B and 90C may include perforations.

Outlet baffle assembly 38 further includes baffle 90D, 90E, and 90F positioned in channel 39. Baffle 90D is positioned perpendicular to baffle 90A and extends between baffle 90A and the rear wall 29. Baffle 90E is perpendicular to baffle 90B and extends between baffle 90B and the rear wall 29. Baffle 90F is perpendicular to baffle 90C and extends between baffle 90C and the rear wall 29. Baffles 90D, 90E, and 90F are configured to further reduce velocity of the fluid flow and promote grit removal from the fluid.

Although the outlet baffle assembly 38 is shown as including six baffles, in other embodiments, the outlet baffle assembly may include one, two, three, four or more redirecting plates. The baffles can be curved, non-curved or any shape which allows for effective redirecting of the waste flow stream. Baffles 90A, 90B, 90C, 90D, 90E, and 90F can also have perforations 94, including but not limited to, circular, square, rectangular, triangular, or any combination of shapes and dimensions. In some embodiments, the outlet baffle assembly may not have perforations, or may have both perforated and non-perforated baffles. The forced flow pattern and redirecting action also promotes velocity reduction and continued shearing and separation of grit particles within the waste flow stream.

The grit removal device 22 removes the increased volume of captured and accumulated grit at the center of the lower portion of the basin 26. The grit removal device 22 can be positioned substantially near the center of the basin and is configured to remove accumulated grit. The grit removal device uses air to lift water and grit particles through an open cylinder 102, out of the basin 26, and into the upper tank 58. While FIG. 1 illustrates the grit removal device as an airlift pump, the system can also utilize a hybrid version of an airlift pump, submersible grit pump, other pump, or a combination of pumps depending on the specifications of the system. The blower drive package 50 may work in combination with the aeration header 18 and the grit removal device 22. The butterfly valve 62 and throttling valve 66 are also used in combination with the aeration header 18 and grit removal device 22.

The adjustable outlet weir assembly 42 is configured to control the flow discharge 86A from the basin 26. The flow exit area of the basin continues to reduce the waste flow stream exit velocity to prevent carryover of lighter particles and to create a final separation of grit particles from the waste flow stream. The flow exit area can include an exit trough 110 for the processed flow stream to exit the system.

In operation and as illustrated in FIGS. 5-22, the waste flow stream enters the basin 26 through the inlet 82 at a high velocity. More specifically, FIGS. 8, 10, 12, 14, 16, 18, 20, and 22 illustrate velocity vectors, or the flow stream patterns in basin 26. FIGS. 7, 9, 11, 13, 15, 17, 19, and 21 illustrate the velocity of the flow stream throughout basin 26.

In operation, a substantial portion of the waste flow stream strikes the inlet baffle assembly 14, thereby directing the waste flow stream both downward and toward the walls of the tank. The inlet baffle assembly 14 also reduces the velocity of the waste flow stream. Following the initial redirection and velocity reduction of the inlet flow stream at the inlet baffle assembly 14, the shearing action of the basin 26 and/or tank sidewalls 30, 34 promotes further separation of grit particles from the waste flow stream and continued reduction of velocity. By forcing the flow to the tank sidewalls 30, 34, the separation of solids is enhanced due to particle collision with the rough wall surface of the tank walls. The flow stream proceeds to the rear 26A of the basin 26 where the flow stream moves up the rear 26A and encounters the outlet baffle assembly 38.

The outlet baffle assembly 38 includes the wings 91A, 91B adapted to force the waste flow patterns back toward the middle of the basin 26. The forced flow pattern and redirecting action promotes further velocity reduction and continued shearing and separation of grit particles within the waste flow stream. The redirectional patterns generated by the baffles further facilitate settling of solids and aid in preventing short-circuiting. The simultaneous final redirection of the flow and the aeration flow pattern caused by the aeration header 18 creates a collision of the flow patterns within the center of the basin 26. The aeration aids in removal of organic matter from the grit particles while maintaining a rolling pattern within the basin to promote separation of solids from the liquid flow. Furthermore, the aeration out provides approximately equal detention time for all portions of the flow. The grit separation is further aided by gravity.

As a result of the collision of flow patterns within the center of the basin, the velocity within approximately the lower one-third of the basin is significantly reduced to create a quiescent zone and area for the settled grit to accumulate and be effectively removed by the airlift pump or other removal means. The reduced velocity flow stream may then continue through the adjustable outlet weir assembly to the exit trough for any further processing.

The surface of the tank may collect floatables and released organics. These floatables and released organics can be removed by a variety of surface skimming mechanisms. FIGS. 2 and 3 illustrate a rotating surface skimmer or scum trough 114. The scum trough 114 is configured to collect floatables from the surface and direct them out of the basin. The upper tank 58 may further include a conveyor 70 and a receiving container 74. The conveyor may be a helical screw conveyer or other conveyer configured to remove and transport grit particles to the receiving container 74 for disposal.

Pumped grit from the basin can be directed to the grit washer or classifier 54 for final washing, dewatering discharge and disposal. The overflow from the grit washer drive or classifier 54 can be routed back into the basin for continued separation and processing. The grit washer drive 54 is configured for dewatering and continued processing of the removed grit particles. The control panel 46 is configured to allow for user control of the system and various components of the system, including but not limited to, the blower drive assembly, grit washer drive, control valves, and the like.

Wall slopes, tank volumes, and tank dimensioning have been optimized for maximum waste flow stream conditions. The configurations have been designed for flow conditions from approximately 0.25 MGD to 10 MGD plant requirements; however, the configurations could be provided, designed, or constructed for any potential flow conditions. Multiple unit configurations can also be utilized for larger waste flow stream requirements.

In some embodiments and as shown in FIG. 4, the system may include a flow bypass channel 118 adapted to receive a measured amount of the flow stream to bypass the system for processing at a later time or when the grit chamber is out of service. The bypass channel 118 includes a channel gate 122 to control movement of the flow stream from the bypass channel 118 into the exit trough. The exit channel or trough also includes an exit gate 126 to block the flow stream from re-entering basin 26.

Various materials can be utilized for the manufacture and construction of components of the system, including but not limited to stainless steel, painted carbon steel, fiberglass, PVC, concrete, and the like.

Overall, the perforated and curved solid baffling in combination with the air flow patterns creates an effective and efficient grit trap for flow rates in the range of 0.25 to 10 MGD, regardless of the removal mechanism employed. However, in other embodiments, the perforated and curved solid baffling in combination with the air flow patterns creates an effective and efficient grit trap for flow rates less than 0.25 MGD or greater than 10 MGD, regardless of the removal mechanism employed. The system including the air lift removal device, a submersible grit pump, or other removal device can operate and perform the overall grit removal process without submerged mechanical equipment. However, in other embodiments, a screw conveyor removal device could also be used with the system.

FIGS. 23-27 illustrate another embodiment of a grit removal system 310 according to the invention. The grit removal system 310 shown in FIGS. 23-27 includes similar structure to the grit removal system 10 and components illustrated in FIGS. 1-22; therefore, like structure is identified by the same reference numerals. Accordingly, with the exception of mutually inconsistent features and elements between the embodiment of FIGS. 23-27 and the embodiments of FIGS. 1-22, reference is hereby made to the description above accompanying the embodiments of FIGS. 1-22 for a more complete description of the features and elements (and the alternatives to the features and elements) of the embodiments of FIGS. 23-27.

The grit removal system 310 includes an inlet baffle assembly 320 having a baffle 325 positioned substantially parallel to the front wall 28. The grit removal system 310 further includes an aeration header 330 positioned such that the aeration piping 340 is positioned between each of the diffusers 350.

Other embodiments of the present invention may utilize combinations of the above embodiments. The embodiments described above and illustrated in the figures are presented by way of example only and are not intended as a limitation upon the concepts and principles of the present invention. As such, it will be appreciated by one having ordinary skill in the art that various changes in the elements and their configuration and arrangement are possible without departing from the spirit and scope of the present invention.

Various features and advantages of the invention are set forth in the following claims.

What is claimed is:

1. An assembly for removing grit particles from a fluid having a flow, the assembly comprising:
   a tank having walls for holding fluid for separation of grit particles from the fluid, the walls including a front wall, a rear wall, and two side walls extending between the front wall and the rear wall, the tank including a center between the front wall and the rear wall;
   a fluid inlet for flow of fluid into the tank, the inlet positioned adjacent the front wall;
   a fluid outlet for flow of fluid from the tank, the outlet positioned adjacent the rear wall;
   an inlet diffusion baffle assembly including a baffle positioned immediately adjacent the fluid inlet to direct fluid flow toward the two side walls and a lower chamber of the tank; and
   an outlet baffle assembly including a baffle positioned in a rear of the tank at an upward slope from the center of the tank toward the fluid outlet configured to direct fluid flow toward the center of the tank.

2. The assembly of claim 1 wherein the inlet diffusion baffle assembly includes a plurality of baffles.

3. The assembly of claim 1 wherein the inlet diffusion baffle assembly includes a plurality of perforations.

4. The assembly of claim 1 wherein the front wall is positioned at a downward slope toward the center of the tank.

5. The assembly of claim 4 wherein the inlet baffle assembly is positioned substantially parallel to the front wall.

6. The assembly of claim 4 wherein the inlet baffle assembly is positioned substantially perpendicular to the front wall.

7. The assembly of claim 1 wherein the outlet baffle assembly includes a plurality of baffles.

8. The assembly of claim 1 wherein the rear wall is positioned at a downward slope from the outlet toward the center of the tank.

9. The assembly of claim 8 wherein at least a portion of the outlet baffle assembly is positioned substantially parallel to the rear wall.

10. The assembly of claim 1, further comprising an aeration header located substantially below the inlet diffusion baffle assembly configured to promote a rolling motion of the fluid near the center of the tank.

11. The assembly of claim 10 wherein the aeration header includes a diffuser.

12. The assembly of claim 1, further comprising a grit removal device positioned in the lower chamber of the tank configured to remove grit particles from the tank.

13. The assembly of claim 12 wherein the grit removal device delivers the grit to an upper tank for removal.

14. The assembly of claim 13 wherein the upper tank includes a conveyor configured to remove and transport grit particles to a receiving container for disposal.

15. The assembly of claim 1, further comprising a surface skimmer configured to collect and deliver grit particles from a surface of the tank to the fluid outlet.

16. The assembly of claim 1, further comprising an adjustable outlet weir assembly positioned adjacent the fluid outlet configured to control fluid discharge from the assembly.

17. An assembly for removing grit particles from a fluid having a flow, the assembly comprising:
   a tank having walls for holding fluid for separation of grit particles from the fluid;
   a fluid inlet for flow of fluid into the tank;
   a fluid outlet for flow of fluid from the tank;
   an inlet diffusion baffle assembly including a baffle positioned to direct fluid flow toward the tank walls and a lower chamber of the tank; and
   an outlet baffle assembly including a baffle positioned in a rear of the tank at an upward slope from the center of the tank toward the fluid outlet configured to direct fluid flow toward the center of the tank, wherein the outlet baffle assembly includes a plurality of perforations.

* * * * *